United States Patent
Kosaki et al.

(10) Patent No.: US 11,541,951 B2
(45) Date of Patent: Jan. 3, 2023

(54) WORKING VEHICLE

(71) Applicant: KUBOTA CORPORATION, Osaka (JP)

(72) Inventors: Takashi Kosaki, Osaka (JP); Takuya Inamori, Osaka (JP); Yoshihiko Kuroshita, Osaka (JP); Michita Kono, Osaka (JP); Yuji Imanaga, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 169 days.

(21) Appl. No.: 17/081,338

(22) Filed: Oct. 27, 2020

(65) Prior Publication Data

US 2021/0139089 A1    May 13, 2021

(30) Foreign Application Priority Data

Nov. 8, 2019   (JP) .............................. JP2019-202901
Nov. 8, 2019   (JP) .............................. JP2019-202902
Nov. 8, 2019   (JP) .............................. JP2019-202903

(51) Int. Cl.
*B62D 49/06*   (2006.01)
*B60N 2/75*   (2018.01)
*B60K 26/02*   (2006.01)

(52) U.S. Cl.
CPC ......... *B62D 49/0692* (2013.01); *B60N 2/797* (2018.02); *B60K 2026/027* (2013.01); *B60K 2026/029* (2013.01); *B62D 49/06* (2013.01)

(58) Field of Classification Search
CPC .... B62D 49/0692; B62D 49/06; B60N 2/797; B60K 2026/027; B60K 2026/029; B60K 26/02
See application file for complete search history.

(56) References Cited

U.S. PATENT DOCUMENTS

| | | | |
|---|---|---|---|
| 2010/0212450 A1* | 8/2010 | Miyasaka | ................. E02F 5/32 74/491 |
| 2016/0009174 A1* | 1/2016 | Yamauchi | ............. A01B 71/02 74/473.3 |

FOREIGN PATENT DOCUMENTS

| | | |
|---|---|---|
| EP | 2 277 736 A1 | 1/2011 |
| EP | 2 965 938 A2 | 1/2016 |
| EP | 2 965 938 A3 | 2/2016 |
| JP | 2007-8222 A | 1/2007 |
| JP | 2016-16739 A | 2/2016 |
| WO | 2015/019943 A1 | 2/2015 |
| WO | WO-2016060061 A1 * | 4/2016 ............... B60N 2/75 |

OTHER PUBLICATIONS

Extended European Search Report issued in corresponding European Patent Application No. 20204086.1 dated Feb. 16, 2021.

* cited by examiner

*Primary Examiner* — Karen Beck

(74) *Attorney, Agent, or Firm* — Greenblum & Bernstein, P.L.C.

(57) ABSTRACT

A working vehicle includes an operator seat, an armrest arranged on a side of the operator seat, and a speed shifter to change a traveling speed. The armrest includes an operation lever to be swung back and forth to cause the speed shifter to perform acceleration and deceleration, and an operation switch to be pressed to cause the speed shifter to perform acceleration and deceleration.

16 Claims, 20 Drawing Sheets

WORKING VEHICLE

CROSS-REFERENCE TO RELATED APPLICATIONS

The present application claims priority under 35 U.S.C. § 119 to Japanese Patent Application No. P2019-202901, filed Nov. 8, 2019, to Japanese Patent Application No. P2019-202902, filed Nov. 8, 2019, and to Japanese Patent Application No. P2019-202903, filed Nov. 8, 2019. The contents of these applications are incorporated herein by reference in their entirety.

BACKGROUND OF THE INVENTION

Field of the Invention

The present invention relates to a working vehicle such as a tractor.

Description of Related Art

The working vehicle disclosed in Japanese Unexamined Patent Publication No. 2016-16739 is previously known.

The working vehicle disclosed in Japanese Unexamined Patent Publication No. 2016-16739 has an operator seat and an armrest provided on the side of the operator seat. The armrest has an operation lever (a multifunctional operator) for causing the speed shifter device to execute a speed-shift operation by pivoting.

The working vehicle disclosed in Japanese Unexamined Patent Publication No. 2016-16739 is provided with an operator seat and an armrest provided on the side of the operator seat. A number of operation tools (operation switches) are arranged on an upper surface of the armrest.

The working vehicle disclosed in Japanese Unexamined Patent Publication No. 2007-8222 has an operator seat and an armrest provided on the side of the operator seat. The armrest is provided with operation tools such as a main speed-shift lever and a secondary speed-shift lever that perform operations related to traveling. In addition, an accelerator lever and other operation tools are provided in the vicinity of the steering wheel.

SUMMARY OF THE INVENTION

A working vehicle according to one aspect of the present invention, includes: an operator seat; an armrest arranged on a side of the operator seat; and a speed shifter to change a traveling speed. The armrest includes: an operation lever to be swung back and forth to cause the speed shifter to perform acceleration and deceleration; and an operation switch to be pressed to cause the speed shifter to perform acceleration and deceleration.

A working vehicle according to one aspect of the present invention includes: an operator seat; and an armrest arranged on a side of the operator seat. The armrest includes: an operation lever to be operated back or forth to perform a traveling operation; and a traveling operation lever to be operated rotatably about a lateral axis to perform the traveling operation, and the operator seat is located on extensions of operational directions of the operation lever and the traveling operation lever.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
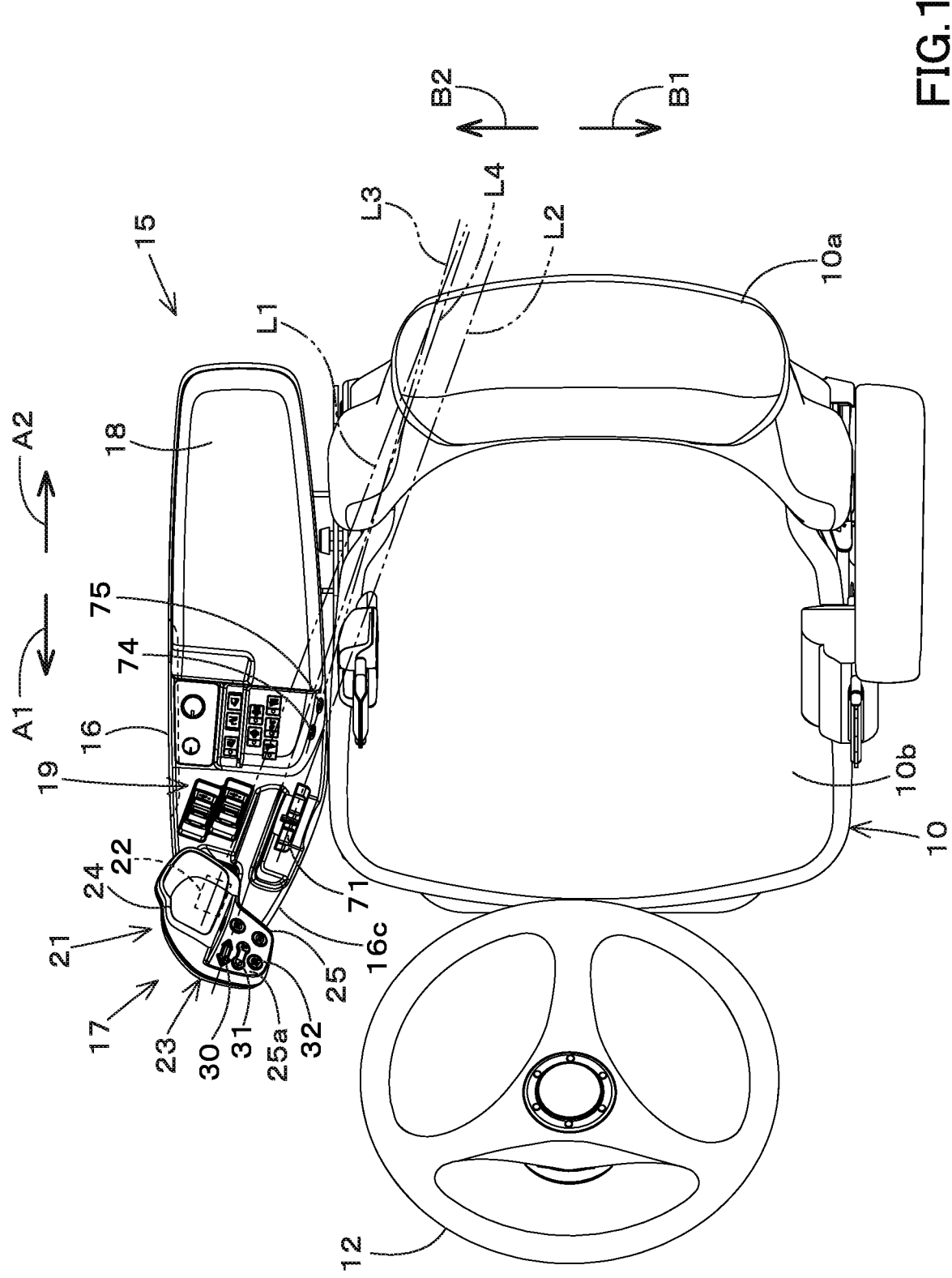
FIG. 1 is a plan view illustrating an operator seat, an armrest, and a steering wheel according to an embodiment of the present invention.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

Figure 17:
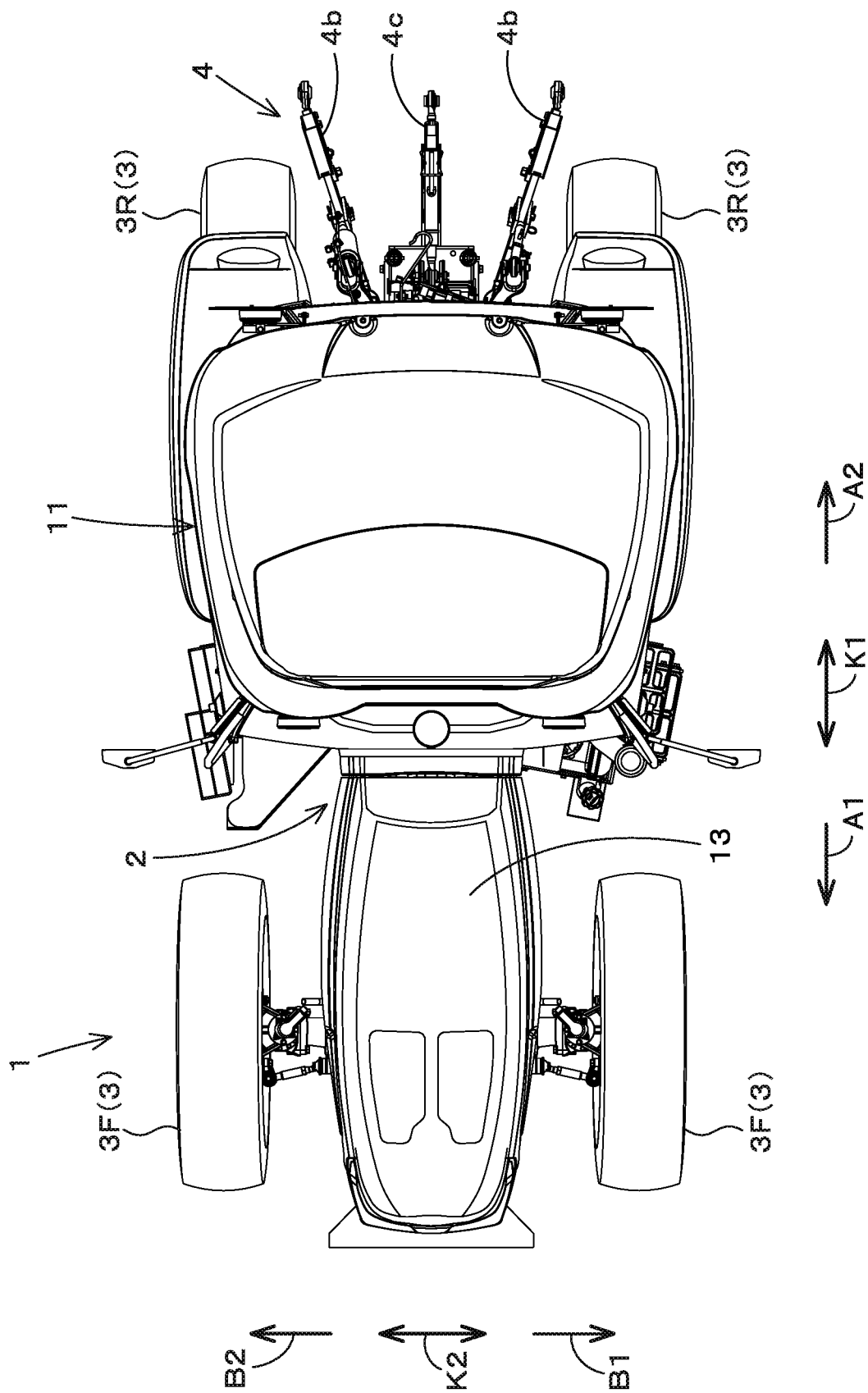
FIG. 17 is a plan view illustrating a working vehicle according to the embodiment.
Figure 18:
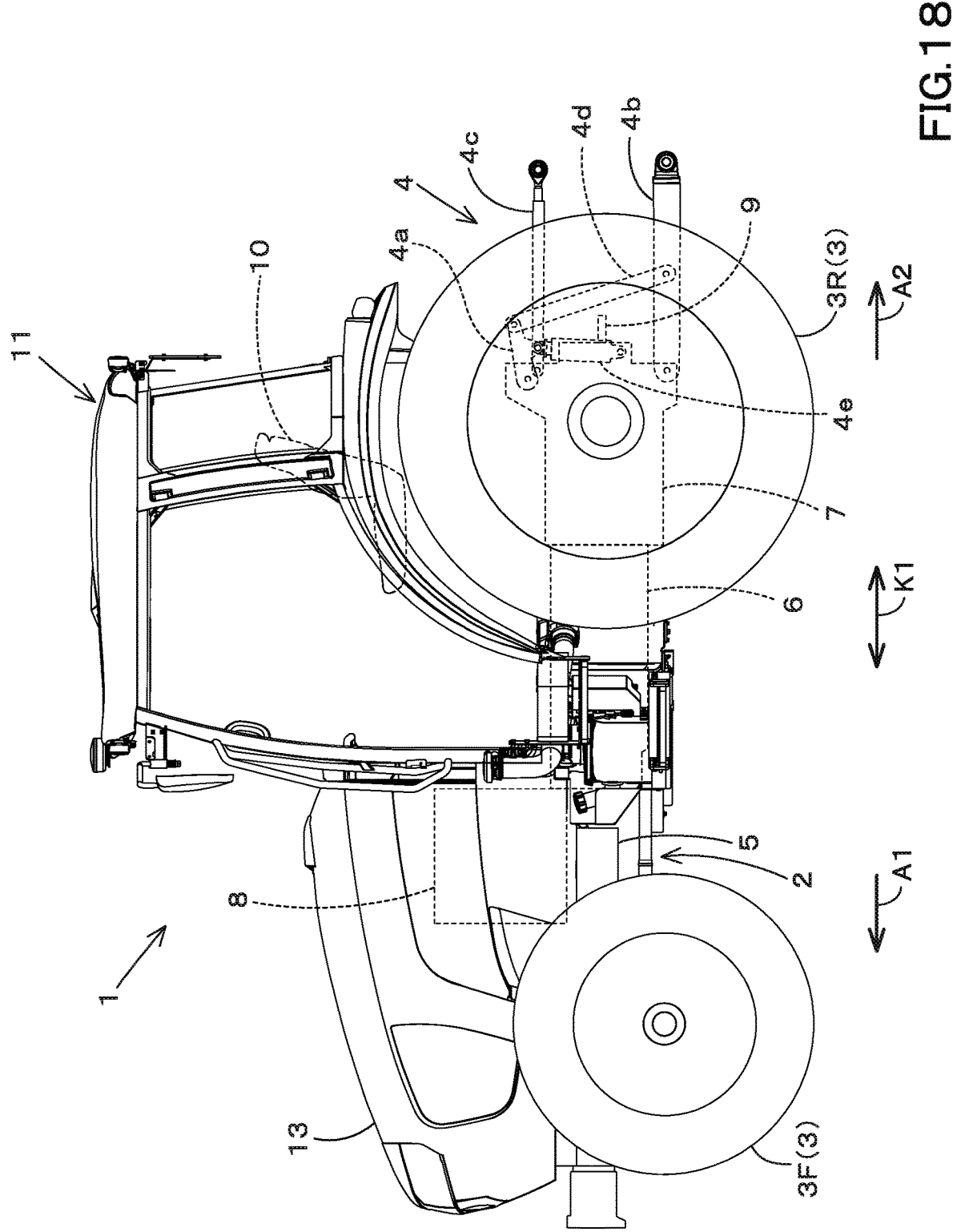
FIG. 18 is a side view illustrating a working vehicle according to the embodiment.

FIG. 17 is a plan view of the working vehicle 1, and FIG. 18 is a side view of the working vehicle 1. The working vehicle 1 is a vehicle for performing agricultural work, and in the case of the present embodiment, the working vehicle 1 is a tractor. It will be hereinafter explained that the working vehicle 1 is the tractor 1. However, the working vehicle 1 is not limited to the tractor.

In the following description, the front side of an operator seated on the operator seat 10 of the tractor 1 (a direction of arrowed line A1 in FIG. 17 and FIG. 18) will be described as the front, the rear side of the operator (a direction of arrowed line A2 in FIG. 17 and FIG. 18) will be described as the rear, the left side of the operator (a direction of arrowed line B1 in FIG. 17) will be described as the left, and the right side of the operator (a direction of arrowed line B2 in FIG. 17) will be described as the right. The direction indicated by an arrowed line K1 in FIGS. 17 and 18 is explained as a front-to-back direction. The horizontal direction orthogonal to the front-to-back direction (a direction of arrowed line K2 in FIG. 18) is referred to as a machine width direction.

<Overall Configuration of Working Vehicle>

As shown in FIG. 17 and FIG. 18, the tractor 1 is provided with a vehicle body 2, a traveling device 3, and a coupler portion 4.

As shown in FIG. 18, the vehicle body 2 has a body frame 5, a clutch housing 6, and a transmission case 7. The body frame 5 extends in the front-to-back direction of the vehicle body 2. The body frame 5 has a prime mover 8 mounted on the body frame 5. In the case of this embodiment, the prime mover 8 is an engine 8. The upper portion of the engine 8 is covered with the bonnet 13 the clutch housing 6 is connected to the rear portion of the engine 8 and houses the clutch.

The speed shifter case 7 is connected to the rear portion of the clutch housing 6 and houses a speed shifting device, a rear wheel differential device (rear wheel differential device) and the like. The speed shifting device is a device for changing the traveling speed of the tractor 1 and includes a main speed shifting device and a sub speed shifting device. A PTO shaft (rear PTO) 9 protrudes at the rear portion of the vehicle 2 (behind the speed shifter case 7). Although not shown in the drawings, a PTO shaft (front PTO) also protrudes forward from the vehicle body 2. The rear PTO and front PTO are rotated or stopped by connecting or disconnecting the PTO clutch (not shown in the drawings).

The traveling device 3 has a front wheel 3F provided at the front portion of the vehicle body 2 and a rear wheel 3R provided at the rear portion of the vehicle body 2. The front wheels 3F are supported by the body frame 5. The rear wheels 3R are supported on the output shaft of the rear wheel differential device. The rear wheel 3R may be a tire or a crawler.

The coupler portion 4 is provided at the rear portion of the vehicle body 2. The coupler portion 4 is a part for connecting a working device (ground working device) for working on a field (farmland) or the like to the rear portion of the tractor 1. The working device is driven by a driving force transmitted from the PTO shaft 9, for example. In particular, the working device includes, but is not limited to, a cultivator, a sprayer, a sowing machine, and the like.

The coupler portion 4 is a lifter device driven by an operation tool such as a hydraulic cylinder to raise or lower the working device (hereinafter also referred to as "lifter device 4"). In the case of this embodiment, the lifter device 4 is a three-point link mechanism and has a lift arm 4a, a lower link 4b, a top link 4c, a lift rod 4d, and a lift cylinder 4e. A horizontal control device (Monroe) is provided at the rear portion of the vehicle body 2 to maintain the working device horizontal.

The vehicle body 2 is provided with an operator seat 10 and a cabin 11 surrounding the operator seat 10. As shown in FIG. 1, the operator seat 10 has a backrest portion 10a and a seat portion 10b. In front portion of the operator seat 10, a steering wheel 12 is provided in front of the operator seat 10.

The tractor 1 is provided with a controller device (not shown in the drawings) that controls the traveling system and the working system. The controller device is provided with an calculator portion (such as a CPU), a storage portion (memory), and the like, and executes a predetermined control based on a program stored in the storage portion.

More specifically, the controller device controls the traveling system and the working system of the tractor 1 based on the operation signals when operating the operation tools (levers, switches, dials, and the like) installed around the operator seat 10 and the detected signals of various sensors mounted on the vehicle body 2. For example, the controller device executes operations relating to the speed-shift (acceleration or shifting speed) of the speed shifting based on operation signals from the operation tool, controls relating to the raising and lowering of the lifter device 4 based on operation signals from the operation tool, controls the speed of the engine 8 based on detected signals from the accelerator pedal sensor, and the like.

<Armrest>

As shown in FIG. 1, an armrest 15 is provided on one side of the operator seat 10. The armrest 15 is arranged with a longitudinal direction facing front and rear and a widthwise direction facing the machine width direction. The widthwise direction of the armrest 15 is hereinafter referred to as the width direction of the armrest 15.

The widthwise direction of the armrest 15 is orthogonal to the longitudinal direction of the armrest 15 and is in the same direction as the machine width direction. In the present embodiment, one side is on the right side and the other side opposite the one side is on the left side. Thus, one side of the armrest 15 is opposite to the operator seat 10, and the other side of the armrest 15 is opposite to the operator seat 10.

As shown in FIG. 2 to FIG. 8, the armrest 15 has a main body 16, a swing operating portion 17, an elbow rest 18, and a operation tool arrangement portion 19 provided in the main body 16. The main body 16 has an upper surface 16a, a lower surface 16b, a left side surface 16c, a right side surface 16d, a front surface 16e, and a rear surface 16f.

Figure 6:
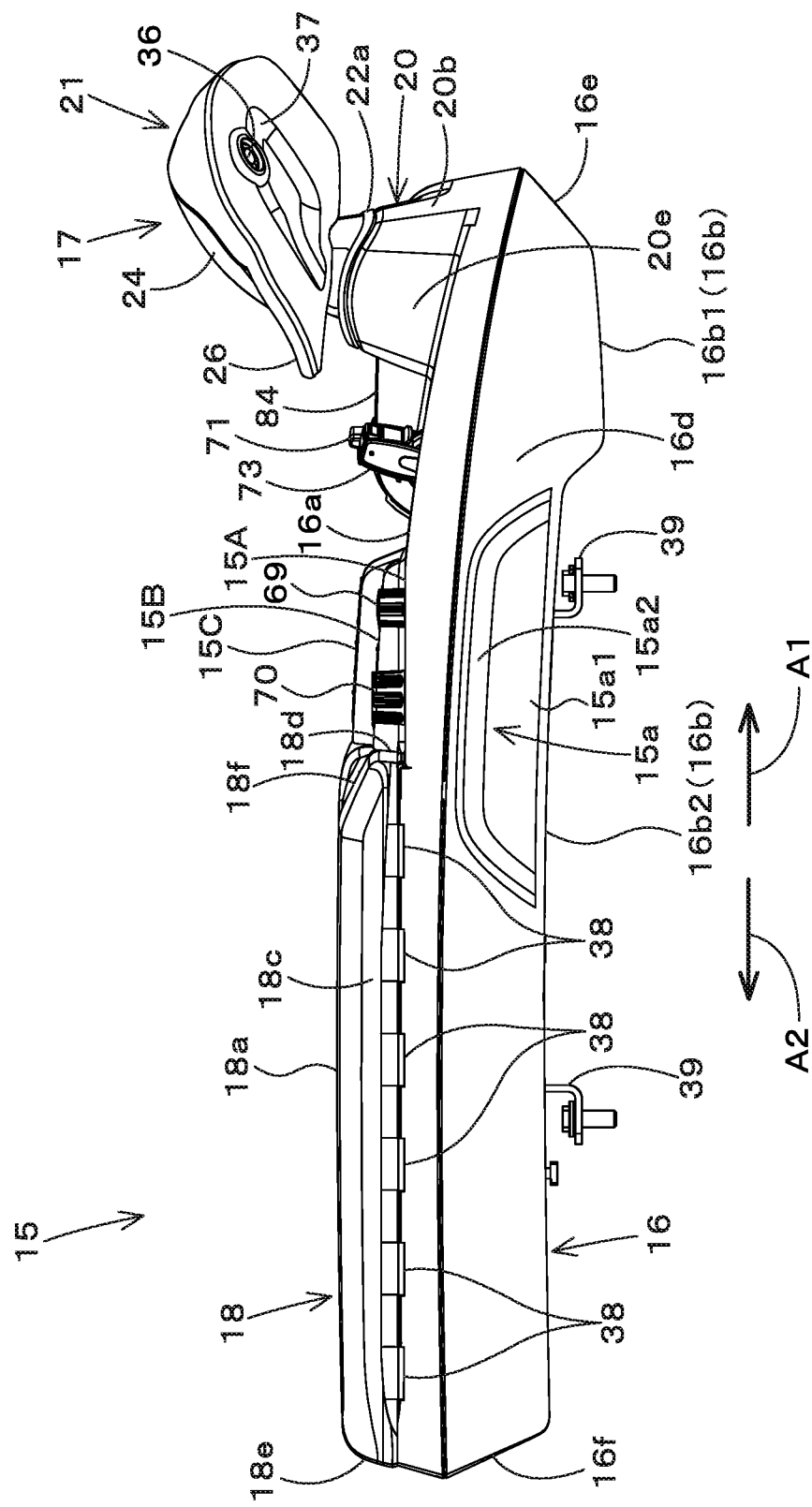
FIG. 6 is a side view illustrating an armrest seen from a side opposite to an operator seat side (from the left) according to the embodiment.

As shown in FIG. 6, the upper surface 16a is gently curved in a convex shape upwardly. The upper surface 16a is sloped to transition downward as it moves forward. The lower surface 16b is recessed upwardly in the rear portion 16b2 compared to the front portion 16b1. This avoids the lower surface 16b of the armrest 15 from coming into contact with the knee (right knee) of an operator seated on the operator seat 10. The rear portion 16b2 of the lower surface 16b is provided with a mounting fixture 39 for attaching the armrest 15 to the side of the operator seat 10.

The left side face 16c connects the left portion of the upper surface 16a to the left portion of the lower surface 16b. The right side surface 16d connects the right part of the upper surface 16a to the right part of the lower surface 16b. Front side surface 16e connects a front part of upper surface 16a, a front part of lower surface 16b, a front part of left side surface 16c, and a front part of right side surface 16d. The rear surface 16f connects the rear portion of the upper surface 16a, the rear portion of the lower surface 16b, the rear portion of the left side surface 16c, and the rear portion of the right side surface 16d.

Figure 4:
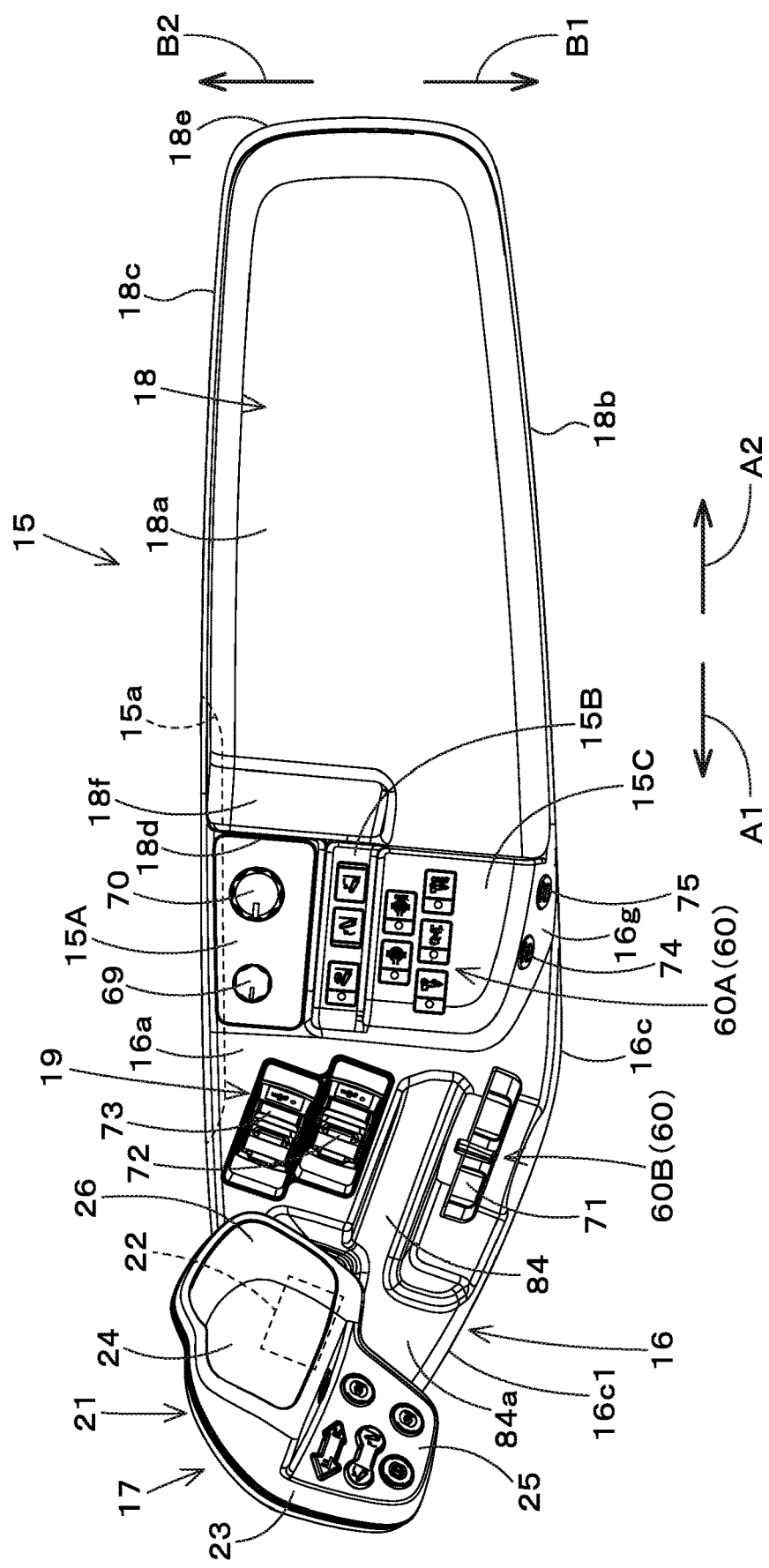
FIG. 4 is a plan view illustrating an armrest according to an embodiment.
Figure 7:
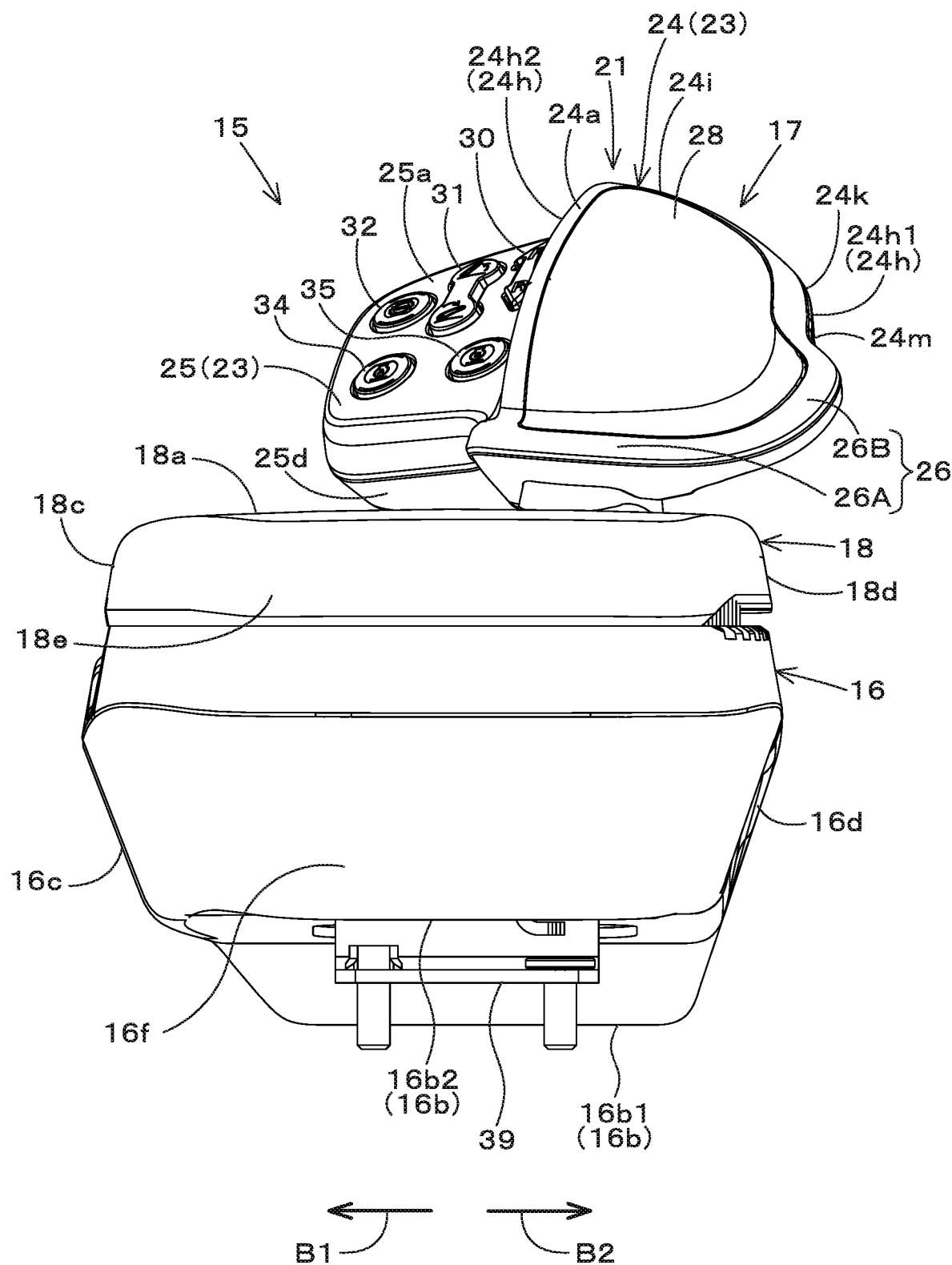
FIG. 7 is a back view illustrating an armrest according to the embodiment.

As shown in FIG. 4, the front part of the left side surface 16c is an inclining surface 16c1 that slopes down to transition to the opposite side (right side) of the operator seat 10 as it moves forward. As shown in FIG. 7, the left side face 16c is inclined to transition to the right side as it moves downwardly. The right side plane 16d is inclined to migrate to the left as it moves downwardly.

Figure 5:
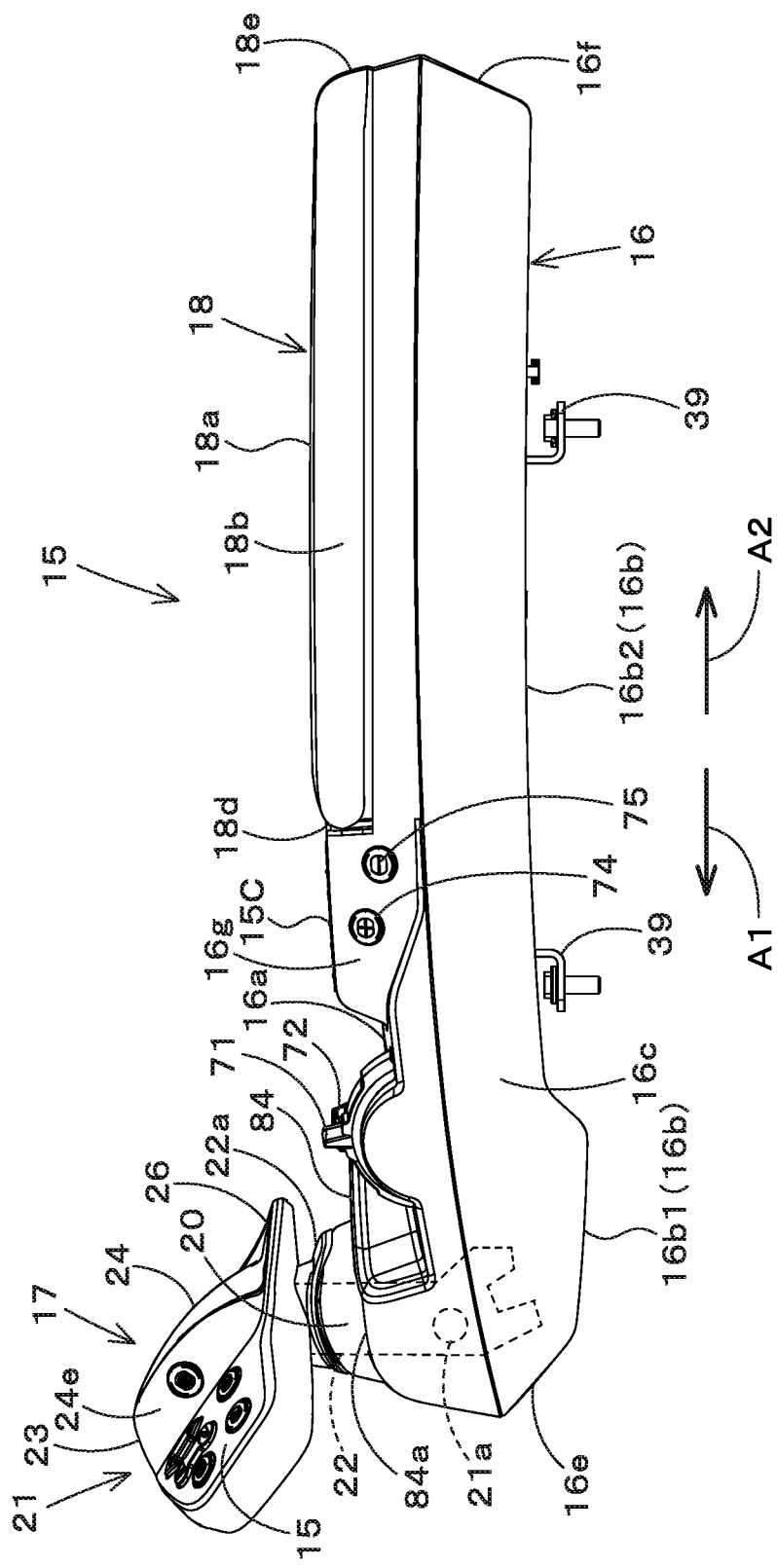
FIG. 5 is a side view illustrating an armrest seen from an operator seat side (from the left) according to the embodiment.

As shown in FIG. 5 and FIG. 6, the lower portion of the front 16e is sloped to transition backward as it moves downward. The upper portion of the front surface 16e is sloped to transition backward as it moves upward. The lower portion of the rear face 16f is inclined to transition forward as it moves downwardly. The upper portion of the rear surface 16f is sloped to transition forward as it moves upward.

Figure 3:
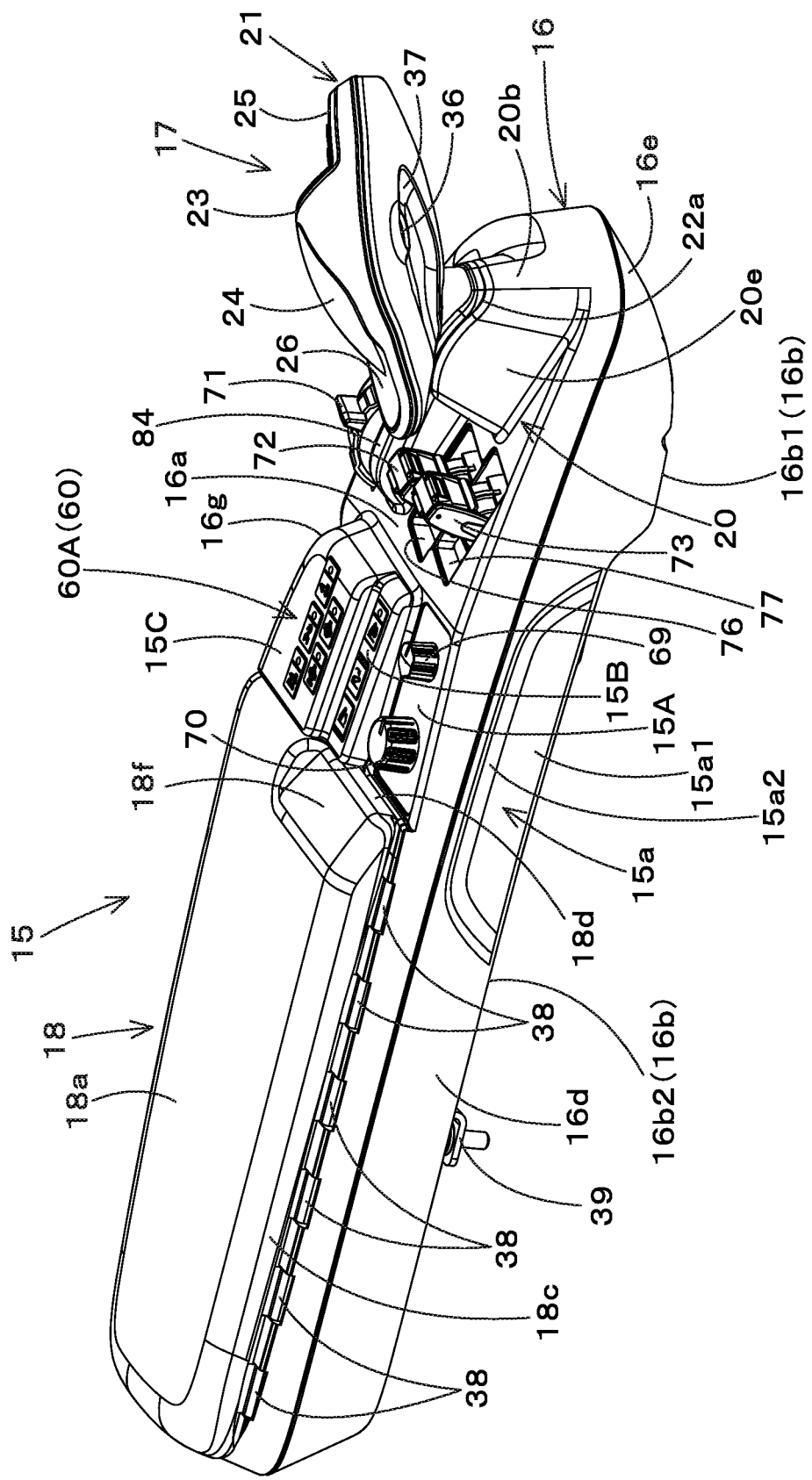
FIG. 3 is an oblique view illustrating an armrest seen from the upper-right front according to an embodiment.

As shown in FIG. 3, FIG. 4, and FIG. 6, a concave portion 15a is provided on a side of the armrest 15. The concave portion 15a is provided on a side of the armrest 15 opposite the operator seat 10 side (right side surface 16d of the main body 16). The concave portion 15a is gradually widening in the front-to-back direction from above to below, and is trapezoidal in side view. The concave portion 15a has a flat portion 15a1, which is most deeply recessed from the right side surface 16d to the left, and a inclining portion 15a2, which slopes down gradually from the right side surface 16d to the flat portion 15a1.

The concave portion 15a is provided in an area that overlaps the area where the operation tool arrangement portion 19 is provided in the front-to-back direction. Note that "A overlaps with B in the front-to-back direction" means that A and B overlap when comparing only the positions of A and B in the front-to-back direction.

In particular, the area in which the concave portion 15a is provided is one of the following five cases.

The first case is a case where, in the front-to-back direction, the front end of the concave portion 15a is located between the front end and the rear end of the region in which the operation tool arrangement portion 19 is provided, and the rear end of the concave portion 15a is located behind the rear end of the region in which the operation tool arrangement portion 19 is provided. In other words, this is a case where the concave portions 15a overlap in the front-to-back direction, displaced backwardly with respect to the region in which the operation tool arrangement portion 19 is provided. The illustrated embodiment falls into this "first case".

The second case is when the front end of the concave portion 15a is located ahead of the front end of the area in which the operation tool arrangement portion 19 is provided in the front-to-back direction, and the rear end of the concave portion 15a is located between the front end and the rear end of the area in which the operation tool arrangement portion 19 is provided. That is, the concave portion 15a is displaced forwardly in the front-to-back direction with respect to the region in which the operation tool arrangement portion 19 is provided and overlaps with the region in which the operation tool arrangement portion 19 is provided.

The third case is when the front end of the concave portion 15a is located ahead of the front end of the region in which the operation tool arrangement portion 19 is provided in the front-to-back direction, and the rear end of the concave portion 15a is located behind the rear end of the region in which the operation tool arrangement portion 19 is provided. That is, the concave portion 15a extends in the front-to-back direction beyond the region where the operation tool arrangement portion 19 is provided, forward and backwardly.

The fourth case is a case where, in the front-to-back direction, both the front end and the rear end of the concave portion 15a are located between the front end and the rear end of the region where the operation tool arrangement portion 19 is provided. In other words, this is a case where the concave portion 15a extends short in the front-to-back direction without extending beyond the area where the operation tool arrangement portion 19 is provided, neither forward nor backward.

The fifth case is a case where, in the front-to-back direction, the front end of the concave portion 15a coincides with the front end of the region in which the operation tool arrangement portion 19 is provided, and the rear end of the concave portion 15a coincides with the rear end of the region in which the operation tool arrangement portion 19 is provided. In other words, this is a case where the area in which the concave portion 15a is provided coincides with the area in which the operation tool arrangement portion 19 is provided in the front-to-back direction.

Figure 13:
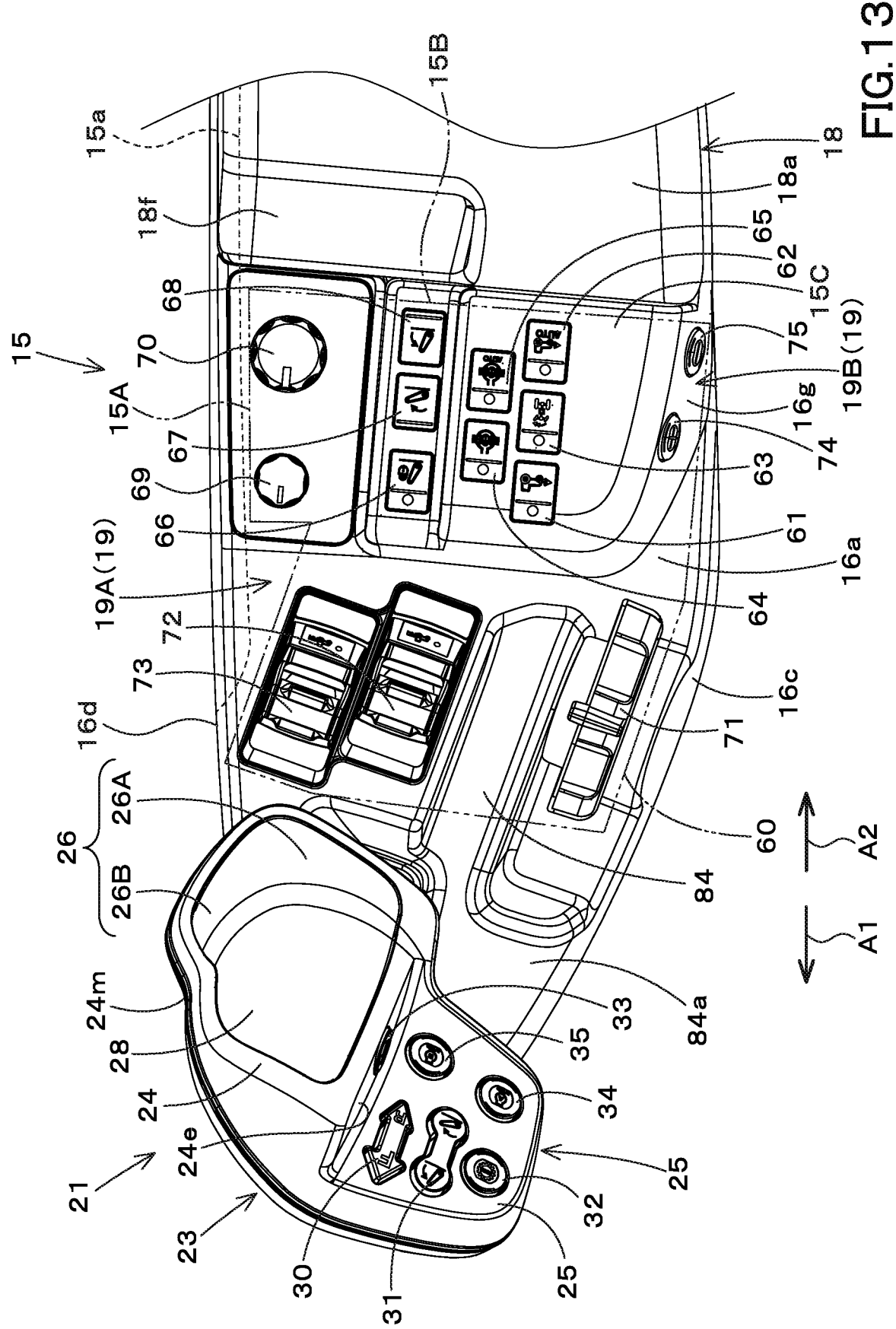
FIG. 13 is a plan view illustrating a front portion of an armrest according to the embodiment.

As shown in FIG. 13, a plurality of operation tools 61 to 75 are arranged in the operation tool arrangement portion 19. Some of the plurality of operation tools (operation tools 69 and 70, operation tools 66 to 68, operation tools 64 and 65, and operation tools 61 to 63) are arranged in a front-to-back direction.

Some of the plurality of operation tools (for example, the operation tool 69 and the operation tool 66 and the operation tool 61) are arranged side by side in the machine width direction. In other words, a portion of the plurality of operation tools (for example, the operation tool 69 and the operation tool 66 and the operation tool 61) are arranged side by side from the side of the side where the concave portion 15a is provided (right side surface 16d) to the side opposite to the side (left side surface 16c).

The concave portion 15a is provided in an area where it overlaps a plurality of operation tools (operation tools 69 and operation tools 70, operation tools 66 to 68, operation tools 64 and operation tools 65, operation tools 61 to 63) arranged in a front-to-back direction in a front-to-back direction. In detail, the concave portion 15a is provided over the entire length of the plurality of operation tools (operation tools 69 and operation tools 70, operation tools 66 to 68, operation tools 64 and operation tools 65, operation tools 61 to 63) arranged in a front-to-back direction.

In other words, the front end of the concave portion 15a is located forward of the front end of the plurality of operation tools aligned in the front-to-back direction, and the rear end of the concave portion 15a is located rearward of the rear end of the plurality of operation tools aligned in the front-to-back direction. In other words, the concave portion 15a is provided in the front-to-back direction over the entire length of the range where the first operation tool group 60A, described below, is provided.

The concave portion 15a is formed to be large enough to allow an operator seated on the operator seat 10 to hook four fingers, excluding the thumb, when operating the operation tool arranged in the operation tool arrangement portion 19. Thus, the length of the concave portion 15a in the front-to-back direction is set to be long enough to hook the four fingers, excluding the thumb. The concave portion 15a is provided in the front-to-back direction over an area straddling the elbow rest 18 and the operation tool arrangement portion 19.

By providing a concave portion 15a on the side of the armrest 15, the operator (worker) can operate the operation tool arranged in the operation tool arrangement portion 19 with a thumb or the like while hooking fingers other than a thumb to the concave portion 15a. Thus, it is possible to operate the operation tools arranged in the operation tool arrangement portion 19 stably and securely.

<Swing Operating Portion>

As shown in FIG. 2 to FIG. 8, the swing operating portion 17 is swung at the front portion of the armrest 15. The swing operating portion 17 has a pedestal 20 and an operation lever 21.

The pedestal 20 is a portion that supports the base portion (lower portion) of the operation lever 21. The pedestal 20 is raised in front of the armrest 15. The pedestal 20 rises upwardly from the upper surface 16a of the main body 16. The pedestal 20 is raised higher than the upper surface 18a of the armrest 18. In other words, the height of the top end of the pedestal 20 (height from the upper surface 16a) is higher than the height of the upper surface 18a of the elbow rest 18.

Figure 11:
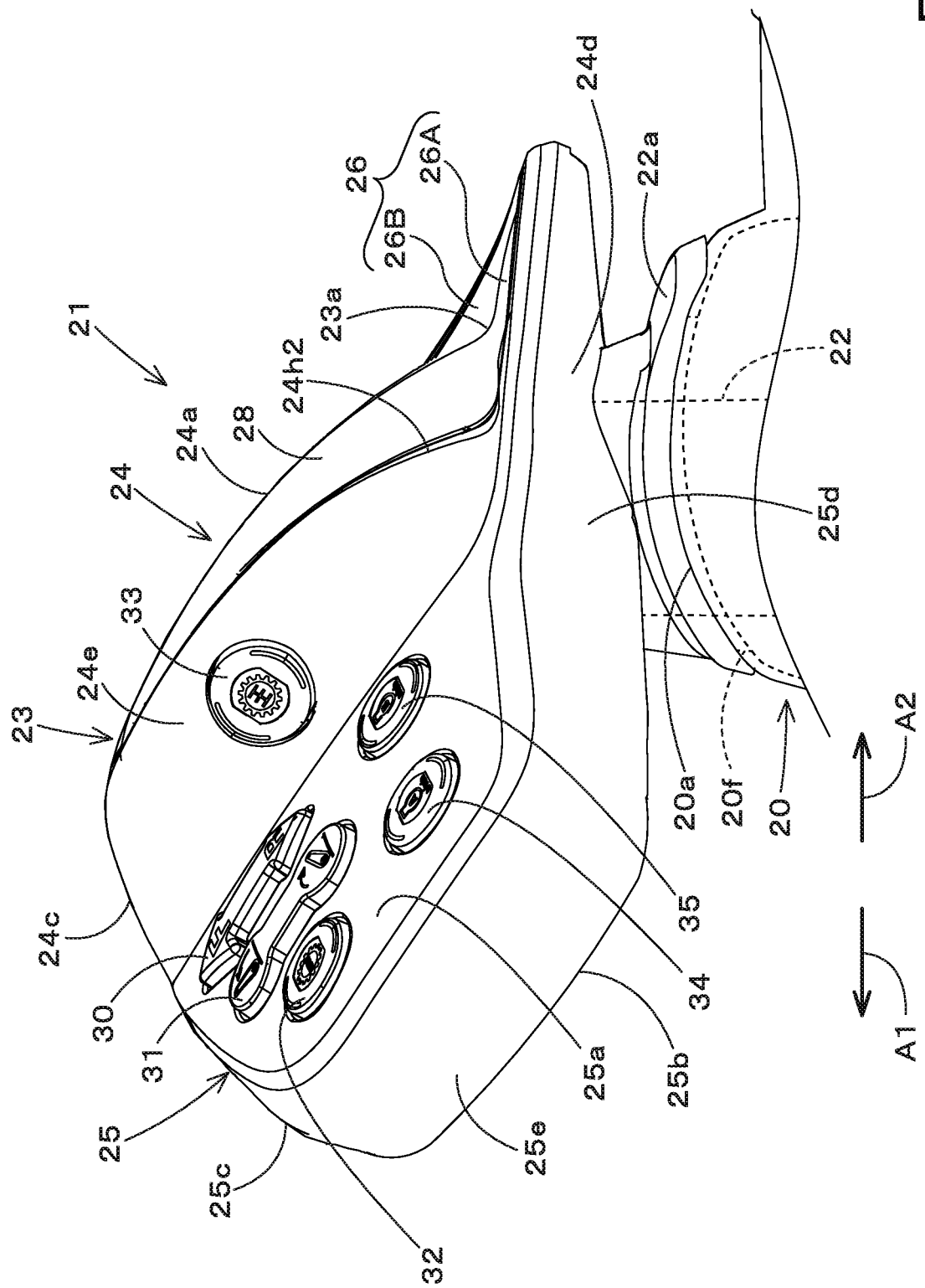
FIG. 11 is a side view illustrating a configuration around a grip of an armrest seen from an operator seat side (from the left) according to the embodiment.

The pedestal 20 is formed in the shape of an substantially square pyramidal base, which tapers upwardly. The pedestal 20 has an upper surface 20a, a front surface 20b, a rear surface 20c, a left surface 20d, and a right surface 20e. The distance between the front surface 20b and the rear surface 20c and the distance between the left side 20d and the right side 20e gradually narrows toward the top. As shown in FIG. 11, the upper surface 20a of the pedestal 20 is curved in a convex arc shape upwardly.

The pedestal 20 is formed from a hard material and does not deform when the operation lever 21 is pivoted. As shown in FIG. 11, an opening portion 20f is formed in the upper surface 20a of the pedestal 20. The opening portion 20f is formed in the shape of a long circle extending in the front-to-back direction.

The operation lever 21 protrudes upwardly from the upper surface of the armrest 15 (the upper surface 16a of the main body 16). As shown in FIG. 4 and FIG. 5, the operation lever 21 has an swing body 22 and a grip 23.

As shown in FIG. 5, the swing body 22 is an axial body inserted into the pedestal 20 and is the swinging axis (pivoting shaft) of the operation lever 21. The swing body 22 is pivotable in the front-to-back direction. The swing body 22 protrudes upwardly through the upper surface 20a of the pedestal 20.

As shown in FIG. 11, the perimeter of the upper portion of the swing body 22 is coated from a cover having a skirt 22a at the bottom. The skirt 22a is curved along the upper surface 20a of the pedestal. The skirt 22a moves along the upper surface 20a of the pedestal when the operation lever 21 is pivoted.

As shown in FIG. 4, the swing body 22, which is the swinging axis of the operation lever 21, is located closer to the side of the operator seat 10 and the opposite side of the operator seat 10 (right side surface 16d) than to the side of the operator seat 10 of the armrest 15 (left side surface 16c). In other words, the swing body 22 is displaced to the right side with respect to the center of the armrest 15 in the machine width direction.

The lower portion of the swing body 22 is pivotally supported on a lateral shaft 21a (an axis extending in the width direction of the body) (see FIG. 5) provided inside the armrest 15. The lateral shaft 21a is an axis that serves as a swing point for the swing body 22. The operation lever 21 (the swing body 22 and the grip 23) can be pivoted in the forward and backward direction around the lateral axis 21a.

By swinging the operation lever 21 in the forward and backward direction, the speed shifter (the main transmission) can be activated to operate the speed shifter (the main transmission) to operate the speed shifter. In other words, the operation lever 21 is a lever that allows the speed shifter to execute an increase or decrease in speed by swinging forward or backward.

In particular, by swinging the operation lever 21 forward, the speed shifter can be made to perform an acceleration operation. By swinging the operation lever 21 backwardly, the speed shifter can be made to perform a deceleration operation.

The above controller device controls the drive of the speed shifter (main transmission) based on the operation of the operation lever 21. In particular, the controller device causes the speed shifter to perform an acceleration operation when the operation lever 21 is pivoted forward, and causes the speed shifter to perform a deceleration operation when the operation lever 21 is pivoted backward.

The operation lever 21 is a self-returning lever that returns from the operating position (the forward or rearward swinging position) to the non-operating position (the position before swinging operation) when the operation is stopped. When the operation lever 21 is pivoted forward or backward to the operating position, the speed shifter is turned on and the speed shifter is executed, and when the hand is removed from the operation lever 21, the operation lever 21 returns to the non-operating position and the speed shifter is turned off and the speed shifter is not executed.

When the operation lever 21 is pivoted forward, the swing body 22 hits the front edge of the opening portion 20f and stops, and when it is pivoted backward, the swing body 22 hits the rear edge of the opening portion 20f and stops. In other words, the swinging of the operation lever 21 in the forward and backward direction is regulated by the opening portion 20f.

As shown in FIG. 5, the grip 23 is provided on top of the swing body 22. As shown in FIG. 7, FIG. 9, FIG. 11 and FIG. 13, the grip 23 has a gripping portion 24, an operating portion 25 and an extending portion 26. The grip 24 is a portion that is gripped with one hand (right hand) by an operator seated on the operator seat 10. The operating portion 25 is a portion for an operator gripping the grip portion 24 to extend his or her thumb to perform operations.

The extending portion 26 is a portion for an operator gripping the grip portion 24 to place the little finger side of the palm (little finger ball) or the like on the palm, and supports the palm gripping the grip portion 24 so that it does not shift downwardly or sideways. The gripping portion 24, the operating portion 25 and the extending portion 26 are integrally formed.

First, the shape of the grip 24 of the grip 23 will be described below.

The grip 24 is provided on one side (right side) of the grip 23. In other words, the grip portion 24 is provided on the opposite side of the operator seat 10 of the grip 23. As shown in FIG. 7 to FIG. 13, the grip portion 24 has a surface 24a, a back surface 24b, a upper surface 24c, a bottom surface 24d, a left side surface 24e, a right side surface 24f, and a corner edge surface 24g.

Figure 10:
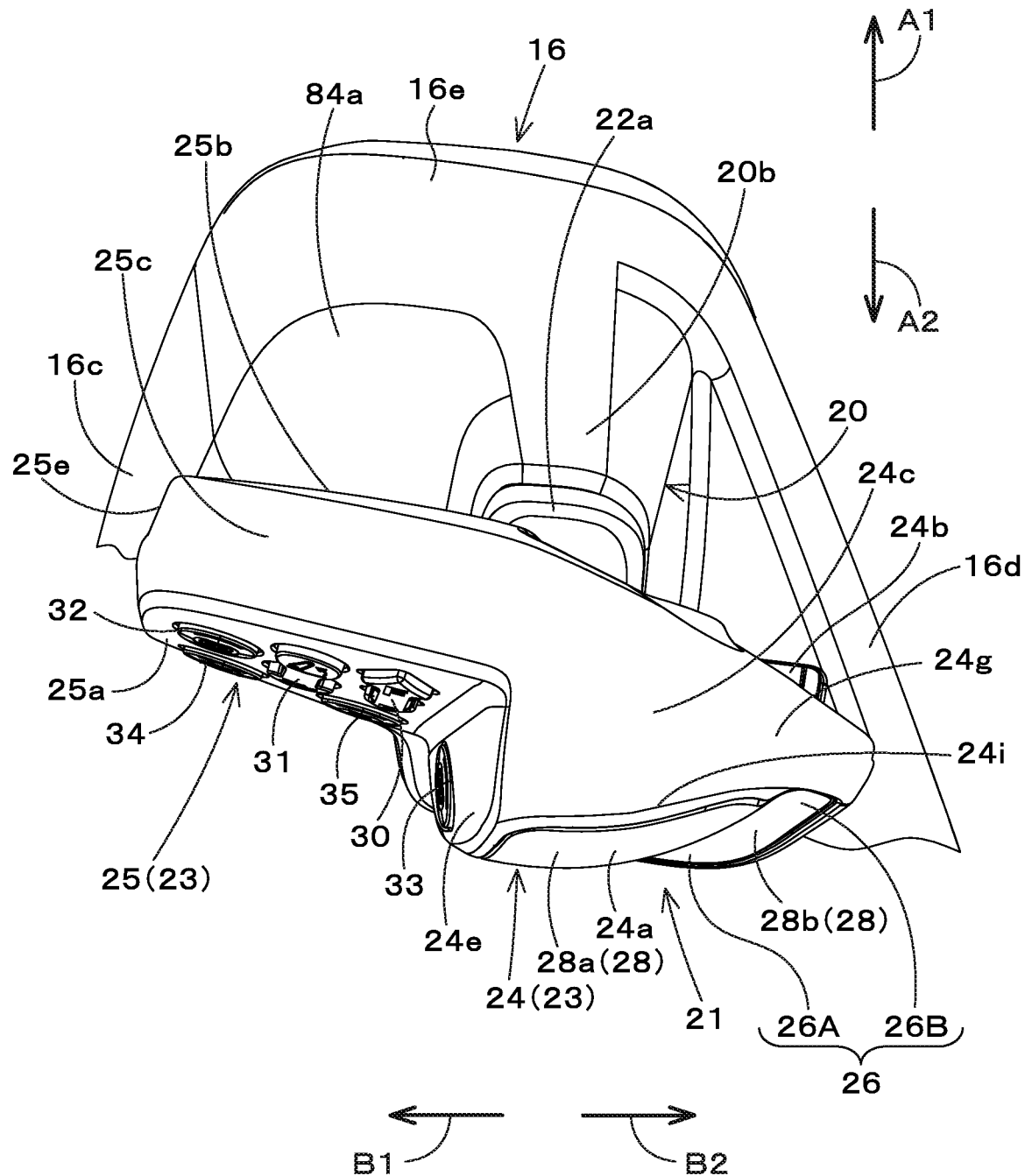
FIG. 10 is a view illustrating a configuration around a grip of an armrest seen from a direction in which a back surface of a grip portion can be seen substantially as a vertical surface according to the embodiment.

The surface 24a of the grip portion 24 includes the right portion of the surface of the grip 23 (the surface facing the operator seated on the operator seat 10). The surface 24a is the portion that the palm touches when gripping the grip 24. As shown in FIG. 10, the surface 24a is a curved surface extending from the other side (left side) to the one side (right side) in a curved manner.

Figure 12:
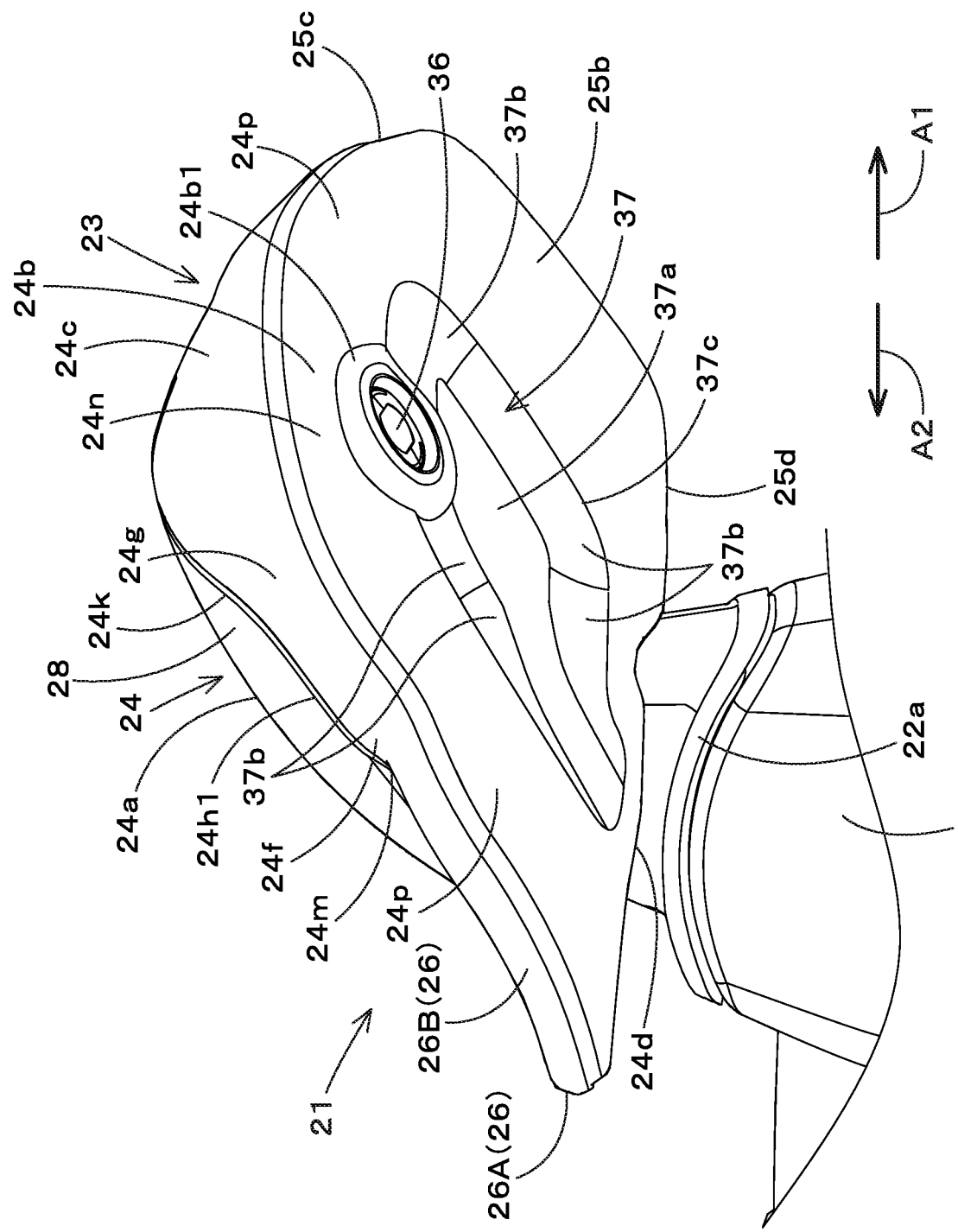
FIG. 12 is a side view illustrating a configuration around a grip of an armrest seen from a side opposed to an operator seat side (from the right) according to the embodiment.

The surface 24a of the grip portion 24 is hereafter referred to as the "curved surface 24a". As shown in FIG. 10, the curved surface 24a is convexly curved so that it expands toward the rear. The right portion of the curved surface 24a shifts from the rear to the front as it extends from the left side to the right side. As shown in FIG. 11 and FIG. 12, the curved surface 24a is curved while sloping to transition from downward to upward as it extends from rearward to forward.

Figure 9:
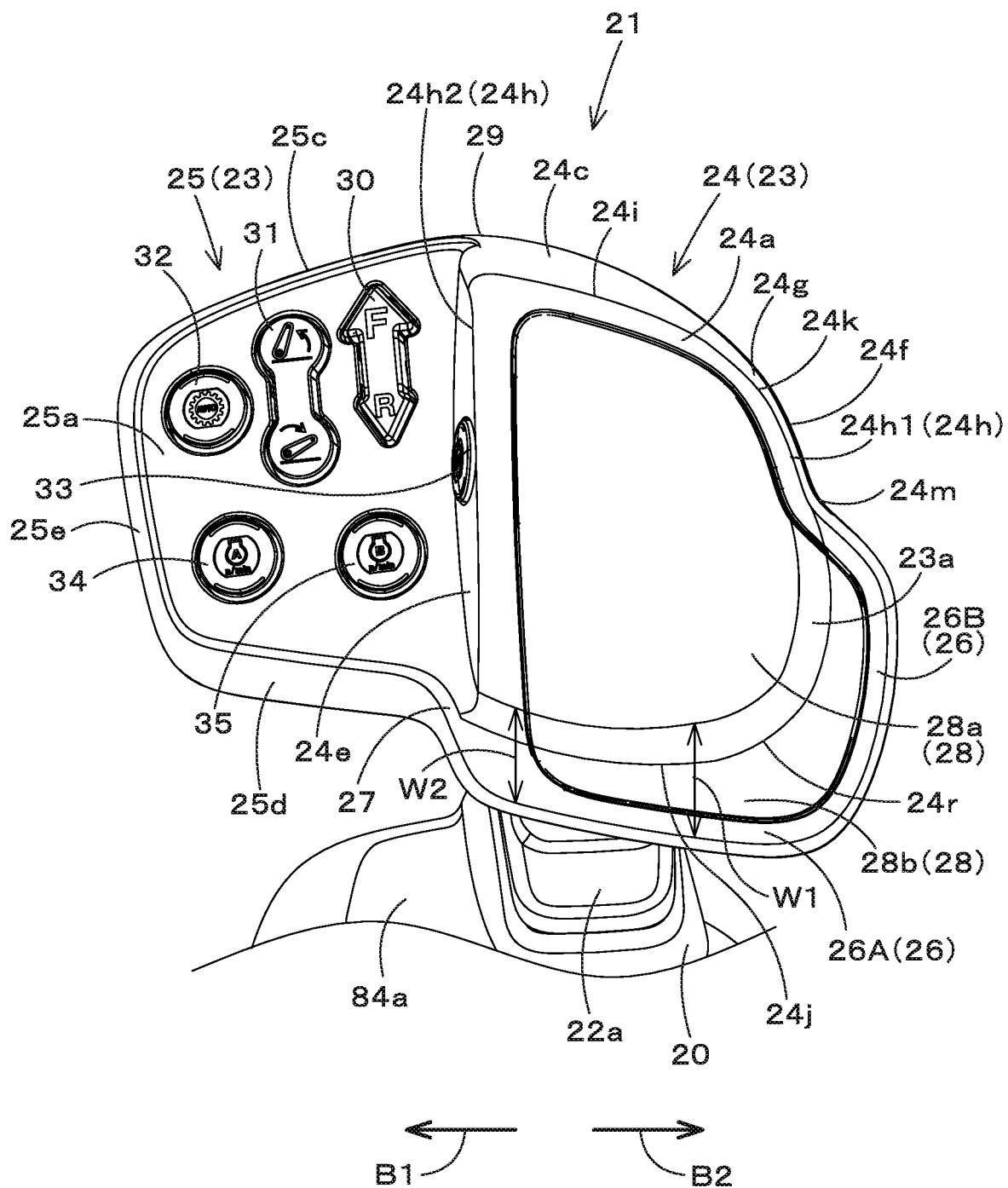
FIG. 9 is an oblique view illustrating a configuration around a grip of an armrest according to the embodiment.

As shown in FIG. 9 and other drawings, the curved surface 24a has a side edge 24h, an upper edge 24i, a lower edge 24j, a corner edge 24k, and a curved edge 24r. The side edge 24h, the upper edge 24i, the lower edge 24j, the corner edge 24k, and the curved edge 24r include the outer edge of the curved surface 24a.

The side edge 24h includes a first side edge 24h1 and a second side edge 24h2. The first side edge 24h1 includes an edge on one lateral side (right side) of the curved surface 24a. The second lateral edge 24h2 includes an edge on the other lateral side (left side) of the curved surface 24a. The upper edge 24i includes an upper edge of the curved surface 24a.

The lower edge portion 24j includes the lower edge of the curved surface 24a. The corner edge 24k connects the side edge (first side edge) 24h1 and the upper edge 24i, and constitutes the upper corner edge of one lateral side (right side) of the curved surface 24a. The curved edge 24r connects the lateral edge (first lateral edge) 24h1 to the lower edge 24j, and constitutes the lower corner edge of one lateral side (right side) of the curved surface 24a.

The first side edge 24h1, the second side edge 24h2, the upper edge 24i, the lower edge 24j, the corner edge 24k, and the curved edge 24r are curved.

The first side edge 24h1 extends from the top to the bottom. As shown in FIG. 9 and the like, the first side edge 24h1 is convexly curved so that it expands slightly to one side (to the right) at the midpoint of the first side edge 24h1 from the top to the bottom. The first side edge 24h1 shifts from the other side (to the left) to one side (to the right) as it extends from the upper to the lower side. As shown in FIG. 12 and other drawings, the first side edge 24h1 transitions from the front to the rear as it extends from the upper to the lower side.

The second side edge 24h2 extends from the upper to the lower side. As shown in FIG. 9 and other drawings, the second side edge 24h2 shifts from one side (to the right) to the other side (to the left) as it extends from above to below. The distance between the first side edge 24h1 and the second side edge 24h2 gradually increases from above to below.

As shown in FIG. 11 and other drawings, the second side edge 24h2 transitions from front to back as it extends from upper to lower. The second side edge 24h2 is convexly curved so that it expands upwardly backwardly at the midway point from above to downward. The curvature becomes more abrupt as it extends from upper to lower.

As shown in FIG. 9 and other drawings, the upper edge portion 24i extends from the other side (left side) to one side (right side) and is curved while sloping to transition from upper to lower as it extends from the other side to one side. As shown in FIG. 10 and other drawings, the upper edge 24i is convexly curved so that it expands backwardly at the midpoint from one side (right side) to the other side (left side).

As shown in FIG. 9 and other drawings, the lower edge portion 24J extends from the other side (left side) to one side (right side). The lower edge 24j is convexly curved so that it expands backwardly at the midway point from the other side to one side.

As shown in FIG. 9 and other drawings, the corner edge portion 24k is curved so as to connect the first side edge portion 24h1 and the upper edge portion 24i with a smooth curve. The corner edge portion 24k is curved with a smaller radius of curvature than the first side edge 24h1 and the upper edge 24i. In other words, the corner edge 24k is curved more sharply than the first side edge 24h1 and the upper edge 24i.

As shown in FIG. 9 and other drawings, the curved edge 24r communicates with the right edge of the lower edge 24j and the lower edge of the first side edge 24h1. The curved edge 24r is formed in the shape of an arc that expands convexly downwardly (right rearwardly) to the right.

As shown in FIG. 9 to FIG. 11, the left side 24e of the grip portion 24 rises from the operating portion 25 toward the curved surface 24a of the grip portion 24. The left side 24e of the grip portion 24 is hereinafter referred to as the "standing surface 24e". The standing surface 24e is a portion that can be touched by a thumb when the grip portion 24 is gripped with a palm on the curved surface 24a. The standing surface 24e connects the operating portion 25 with the second side edge 24h2 of the curved surface 24a.

As shown in FIG. 10, the standing surface 24e is slightly inclined from the other side (left side) to one side (right side) as it rises from the operating portion 25 to the curved surface 24a. The lower edge of the standing surface 24e is connected to the surface 25a of the operating portion 25. The upper edge of the standing surface 24e is connected to the upper surface 24c of the grip portion 24. The right edge of the standing surface 24e is connected to the second side edge 24h2 of the curved surface 24a.

The upper surface 24c of the grip 24 includes the right portion of the upper surface of the grip 23. As shown in FIG. 9 and elsewhere, the upper surface 24c of the grip 24 is inclined from above to below as it extends from the other side (left side) to one side (right side). The upper surface 24c is curved along the curvature of the upper edge 24i of the curved surface 24a.

As shown in FIG. 11 and FIG. 12, the upper surface 24c transitions from downward to upward as it extends from front to rear, and is convexly curved so that it expands upwardly forward at the midpoint from upward to downward. The leading edge of the upper surface 24c is connected to the upper edge 24i of the curved surface 24a. The back edge of the upper surface 24c is connected to the back surface 24b. A left edge portion of the upper surface 24c is connected to an upper edge portion of the standing surface 24e. The left edge of the upper surface 24c is also connected to the upper surface 25c of the operating portion 25.

Figure 8:
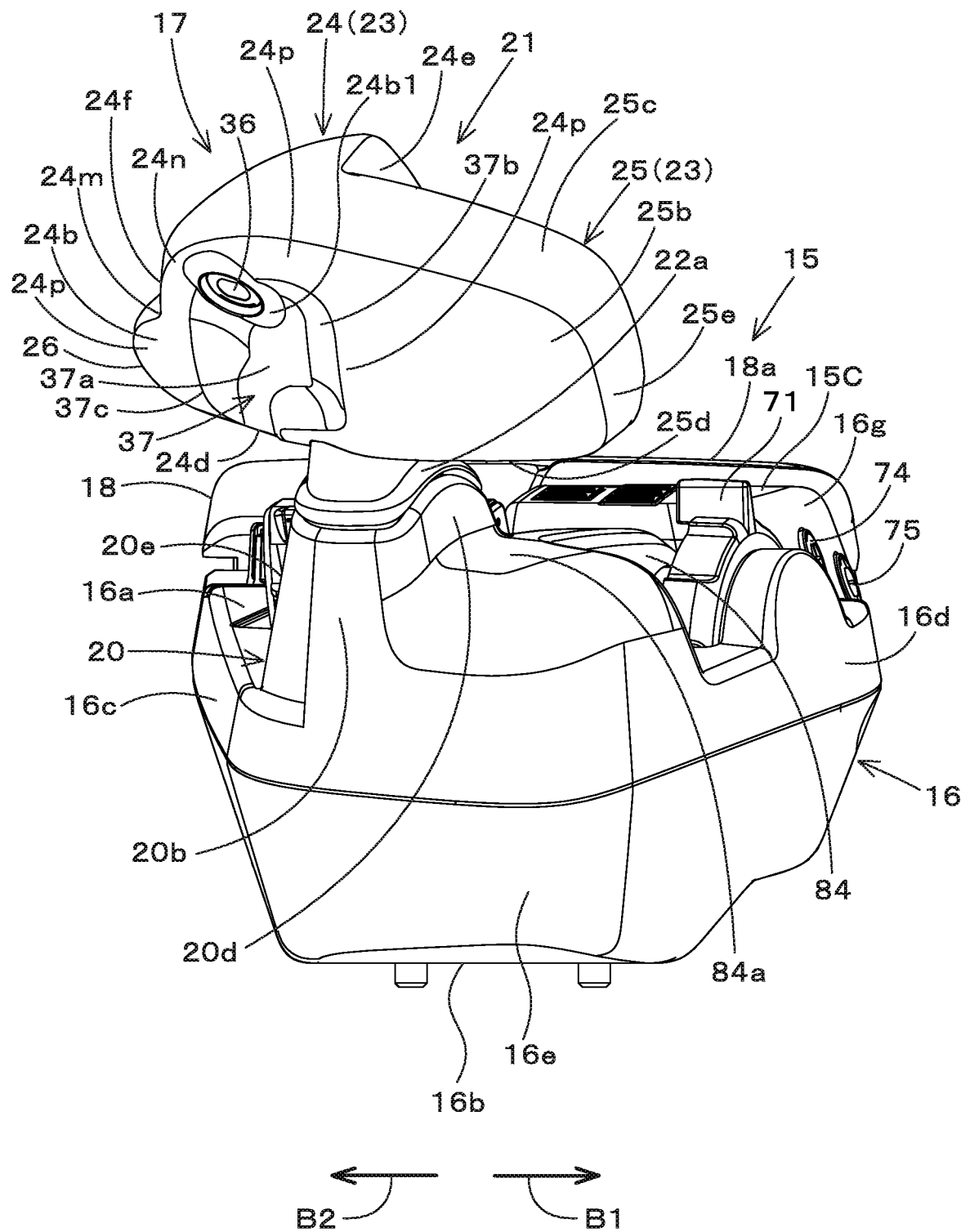
FIG. 8 is a front view illustrating an armrest according to the embodiment.

The right side 24f of the grip 24 includes an upper portion of the right side of the grip 23. As shown in FIG. 8 and other drawings, the right side surface 24f of the grip 24 is curved along the curvature of the first side edge 24h1 of the curved surface 24a. In detail, the right side 24f extends from above to below and transitions to one side (to the right) as it extends from above to below. The distance between the standing surface 24e and the right side 24f gradually increases from above to below. The lower portion of the right side surface 24f is connected to the upper portion of the side of the side portion 26B of the extending portion 26, which will be described below.

As shown in FIG. 9 and elsewhere, the corner edge surface 24g of the grip 24 connects the upper surface 24c with the right side 24f. The corner edge surface 24g is curved along the curvature of the angular edge portion 24k of the curved surface 24a. The corner edge surface 24g is curved so as to connect the upper surface 24c and the right side surface 24*f* with a smooth curved surface. The corner edge surface 24*g* is curved with a smaller radius of curvature than the upper surface 24*c* and the right side surface 24*f*. In other words, while the upper surface 24*c* and the right side surface 24*f* are gently curved, the corner edge surface 24*g* is sharply curved.

The back surface 24*b* of the grip portion 24 includes the right portion of the back surface of the grip 23. The back surface 24*b* is the portion where the fingertips other than the thumb touch the grip portion 24 when the grip portion 24 is gripped with the palm against the curved surface 24*a*. As shown in FIG. 12, the back surface 24*b* of the grip portion 24 is inclined so that it shifts from downward to upward as it extends from the rear to the front.

As shown in FIG. 10, the back surface 24*b* is inclined to transition from forward to backward as it extends from one side (left side) to the other side (right side). The upper edge of the back surface 24*b* is connected to the upper surface 24*c*. The lower edge of the back surface 24*b* is connected to the lower surface 24*d*. A left edge portion of the back surface 24*b* is connected to the back surface 25*b* of the operating portion 25. The right edge of the back surface 24*b* is connected to the right side 24*f* and the side portion 26*b* of the extending portion 26. The corner edge portion of the back surface 24*b* is connected to the corner edge face 24*g*. As shown in FIG. 12, the back surface 24B has a guide concave portion 37 and an operation switch 36, as described below.

The lower surface 24*d* of the grip portion 24 includes the right portion of the lower surface of the grip 23. As shown in FIG. 11 and FIG. 12, the upper end of the swing body 22 is connected to the lower surface 24*d* of the grip 24. The front edge of the lower surface 24*d* is connected to the back surface 24*b*. The back edge of the lower surface 24*d* is connected to the lower surface of the extending portion 26. The left edge of the lower surface 24*d* is connected to the lower surface 25*d* of the operating portion 25. The right edge of the lower surface 24*d* is connected to the right side 24*f* and the side surface of the extending portion 26.

Next, the shape of the operating portion 25 of the grip 23 will be described below.

The operating portion 25 is provided on the other side (left side) of the grip 23. In other words, the operating portion 25 is provided on the operator seat side surface 10 of the grip 23.

As shown in FIG. 7 to FIG. 12, the operating portion 25 has a surface 25*a*, a back surface 25*b*, an upper surface 25*c*, a lower surface 25*d*, and a left side surface 25*e*. In order to clarify the distinction between the surface 25*a* and the surface 24*a* and the like of the grip section 24, the surface 25*a* of the operating portion 25 may be referred to as "second surface 25*a*", the back surface 25*b* may be referred to as "second back surface 25*b*", the upper surface 25*c* may be referred to as "second upper surface 25*c*", the bottom surface 25*d* may be referred to as "second bottom surface 25*d*", and the left side surface 25*e* may be referred to as "second left side surface 25*e*".

The second surface 25*a* includes the left portion of the surface of the grip 23. The second surface 25*a* is a portion of the curved surface 24*a* that can be touched by stretching the thumb when the grip 24 is gripped with the palm against the curved surface 24*a*. As shown in FIG. 11 and other drawings, the second surface 25*a* is inclined to transition from downward to upward as it extends from the rear to the front.

As shown in FIG. 7, FIG. 10, FIG. 11, and the like, the second surface 25*a* is inclined from forward to backward as it extends from the other side (left side) to one side (right side). As shown in FIG. 10 and elsewhere, the second surface 25*a* is located forward of the curved surface 24*a*, which is the surface of the grip portion 24. The second surface 25*a* is provided with a plurality of operation switches 30, 31, 32, 34, and 35, which will be described below.

The second upper surface 25*c* includes a left portion of the upper surface of the grip 23. As shown in FIG. 9 and other drawings, the second upper surface 25*c* is inclined from downward to upward as it extends from the other side (left side) to one side (right side). The upper surface 24*c* of the grip portion 24 and the upper surface (second upper surface) 25*c* of the operating portion 25 are connected in an almond shape with a vertex 29 near the boundary between the grip portion 24 and the operating portion 25.

The second lower surface 25*d* includes a left portion of the lower surface of the grip 23. As shown in FIG. 9 and elsewhere, the second lower surface 25*d* slopes from upward to downward as it extends from the other side (left side) to one side (right side). The distance between the second upper surface 25C and the second lower surface 25D gradually increases as it extends from the other side to one side. The second lower surface 25*d* is connected to the lower surface 24*d* of the grip portion 24 and the lower surface of the extending portion 26 (rearward portion 26A).

The second left side surface 25*e* includes the left side of the grip 23. An upper portion of the second left side surface 25*e* is connected to the left portion of the second upper surface 25*c*. The lower portion of the second left side surface 25*e* is connected to the left portion of the second lower surface 25*d*. The boundary between the second left side surface 25*e* and the second upper surface 25*c* and the boundary between the second left side surface 25*e* and the second lower surface 25*d* are curved, respectively.

The second back surface 25*b* includes the left portion of the back surface of the grip 23. As shown in FIG. 10 and FIG. 12, the second back surface 25*b* is a generally flat surface that is very gently curved. The upper edge of the second back surface 25*b* is connected to the second upper surface 25*c*. The bottom edge of the second back surface 25*b* is connected to the second bottom surface 25*d*. A left edge of the second back surface 25*b* is connected to the second left side of the second back surface 25*e*. The right edge of the second back surface 25*b* is connected to the back surface 24*b* of the grip portion 24.

As shown in FIG. 7, FIG. 9 to FIG. 12, and the like, the extending portion 26 extends from the lower and right portions of the grip portion 24 and extends rearwardly (rearwardly downwardly) and to the right. As shown in FIG. 9, a band-shaped transition area 23*a* is formed in the portion transitioning from the grip portion 24 to the extending portion 26. As shown in FIG. 11, the transition area 23*a* is curved in an arc shape in side view.

As shown in FIG. 9 and other drawings, the extending portion 26 has a rearward portion 26A and a side portion 26B.

The rearward portion 26A extends rearwardly from the lower portion of the grip 24 (lower edge 24J of the curved surface 24A). The rearward portion 26A extends from the other side (left side) to one side (right side) and transitions backward from the other side to one side. The other lateral (left) portion of the rearward portion 26A extends from the curved surface 24A and the standing surface 24E to the other side (left) and is connected to the surface (second surface) 25A of the operating portion 25 through the contact surface 27.

As shown in FIG. 9, the extending portion 26 (rearward portion 26A) extended from the lower portion of the grip 24 has a width of extension W1 on one side (right side) wider than the width of extension W2 on the other side (left side) (W1>W2).

As shown in FIG. 9, the side portion 26B extends from the edge of one lateral side (right side) of the grip portion 24 (first lateral edge 24h1) to one lateral side (right side). The rearward portion 26A and the side portion 26B are continuous from the lower portion of the grip portion 24 to the one lateral side (right side). The width of the extending portion 26 is widest in the lower portion of the one lateral side (lower right side) of the grip portion 24.

In other words, the width of the extending portion 26 is widest at the boundary between the rearward portion 26A and the side portion 26B. The side portion 26B is provided on one lateral side (right side) of the grip portion 24 from a lower end to a midway point in the vertical direction. In other words, the side portion 26B is not provided in the upper portion of the one lateral side (right side) of the grip portion 24.

As shown in FIG. 9, the upper side of the side portion 26B is connected to the right side 24f of the grip portion 24. A bend portion 24m is formed at the portion transitioning from the right side 24f of the grip 24 to the side portion 26B of the extending portion 26, which is bent in a short V-shape (valley-shaped). The bent portion 24m is concave in an obtuse V-shaped shape.

The position of the hand can be determined by placing a finger against the flexed portion 24m when gripping the grip portion 24. This makes it difficult for the hand gripping the grip portion 24 to slip. Since the position of the hand is stabilized while gripping the grip portion 24, it is easy to extend the thumb to operate the operation switches 30 to 35 provided on the operating portion 25 and the standing surface 24e.

As shown in FIG. 7 and FIG. 9 to FIG. 12, the grip 23 has an anti-slip portion 28.

The anti-slip portion 28 includes a material having an anti-slip function, such as rubber. The coefficient of friction of the surface of the anti-slip portion 28 is greater than the coefficient of friction of the surface of the grip portion 24 (the surface of the portion on which the anti-slip portion 28 is not provided). The anti-slip portion 28 is configured by, for example, affixing an anti-slip member such as a rubber plate to the surface of the grip portion 24, embedding the anti-slip member in the surface of the grip portion 24, and the like.

The anti-slip portion 28 is provided to prevent the hand from slipping when gripping the grip portion 24 to operate the operation lever 21 and the like. This enables reliable operation of the operation lever 21, and does not require a strong grip on the gripping portion 24, which is less likely to cause hand fatigue.

The anti-slip portion 28 is provided over (across) the surface of the extending portion 26 from the grip portion 24. In particular, the anti-slip portion 28 is provided over the surface of the extending portion 26 (the rearward portion 26A and the side portion 26B) from the curved surface 24A of the grip portion 24. The portion of the anti-slip portion 28 provided on the curved surface 24a of the grip portion 24 is hereinafter referred to as the "anti-slip portion 28a" and the portion provided on the surface of the extending portion 26 is referred to as the "anti-slip portion 28b".

The anti-slip portion 28a is provided over a large area of the surface of the curved surface 24a of the grip portion 24. In particular, the upper edge of the anti-slip portion 28a is located near the upper edge 24i of the curved surface 24a. The upper right edge of the anti-slip portion 28a is located near the corner edge 24k and the first side edge 24h1 of the curved surface 24a. The left edge of the anti-slip portion 28a is located in the vicinity of the second side edge 24h2 of the curved surface 24a. The lower right edge and lower edge of the anti-slip portion 28a extend beyond the lower edge 24j and the curved edge 24r of the curved surface 24a.

As a result, a large portion of the palm gripping the grip portion 24 comes in contact with the anti-slip portion 28a, which effectively prevents the palm from slipping and mishandling the operation of the operation switch or the like during operation.

The anti-slip portion 28b is provided in the rearward portion 26A and the side portion 26B of the extending portion 26. The anti-slip portion 28b extends beyond the lower edge 24j, the first side edge 24h1, and the curved edge 24r of the curved surface 24A to the surface of the rearward portion 26A and the side portion 26B. The anti-slip portion 28b is provided over a large portion of the extending portion 26.

In particular, the anti-slip portion 28b extends to the vicinity of the rear edge of the rearward portion 26A and the side edge of the side portion 26B of the extending portion 26. This allows the anti-slip portion 28A to reliably perform the function that the extending portion 26 has, which is to support the palm gripping the grip portion 24 so that it does not shift downwardly and sideways.

Next, the operation switch provided in the grip 23 will be described below.

The grip 23 is provided with a plurality of operation switches. The plurality of operation switches are provided on the grip 24 and the operating portion 25, respectively.

As shown in FIG. 7 and FIG. 9 to FIG. 11, the operating portion 25 is provided with a plurality of operation switches 30, 31, 32, 34, and 35. The plurality of operation switches 30, 31, 32, 34, and 35 are provided on the surface (second surface) 25a of the operating portion 25. In particular, the operation switches 30, 31, and 32 are provided on an upper portion of the surface (second surface) 25a of the operating portion 25. The operation switches 34 and 35 are provided at the bottom of the second surface 25a.

A plurality of operation switches 30, 31, 32, 34, and 35 are arranged within a range where an operator holding the grip 24 with his right hand can extend his thumb to operate it. The operation switches 30 and 31 are seesaw switches. The operation switches 32, 34, and 35 are push-button switches.

In particular, the operation switch 30 is a shuttle switch (a switch for switching the traveling vehicle 1 forward and backward) that operates the speed shifter. Pressing the upper portion of the operation switch 30 (the "F" portion) switches it to forward, and pressing the lower portion of the operation switch 30 (the "R" portion) switches it to reverse.

The operation switch 31 is a one-touch switch that drives the lifter device 4 to raise and lower the working device. Pressing the upper portion of the operation switch 31 raises the working device, and pressing the lower portion of the operation switch 31 lowers the working device.

The operation switch 32 is an auto/manual changeover switch for automatic speed-shifting. Pressing the operation switch 32 switches between the automatic speed-shifting mode and the manual transmission mode. In the automatic speed-shifting mode, the optimum vehicle speed step is automatically selected by electronic control within a range of vehicle speed steps set by the operator in advance. In the manual shifting mode, the operator can manually switch between the vehicle speed levels.

The operation switches 34 and 35 are engine speed memory switches, which set the engine speed of the engine 8 to the pre-set engine speed stored in the memory section of the controller device. The operation switch 34 can be pressed to set the revolving speed of the engine 8 to the pre-set first revolving speed by pressing the switch. By pressing the operation switch 35, the operation switch 35 can set the speed of the engine 8 to a second speed different from the predetermined first speed of the engine 8 by pressing it down.

As shown in FIG. 9 to FIG. 11, the standing surface 24e of the grip 24 is provided with other operation switches 33 that are different from the operation switches 30, 31, 32, 34, and 35 provided in the operating portion 25. The other operation switch 33 provided on the standing surface 24e is a push button switch.

The operation switch 33 is a switch to switch the permissibility of swinging the swing body 22, specifically, it is a sub-speed operation switch. By pressing the operation switch 33, the swinging of the swing body 22 is enabled. When the pivot element 22 is pivoted forward while pressing the operation switch 33, the auxiliary speed-shift is shifted up, and when the pivot element 22 is pivoted backward, the auxiliary speed-shift is shifted down. In other words, the operation switch 33 is a switch for switching the permissibility of the speed-shift operation by swinging the swing body 22.

As shown in FIG. 9 and other drawings, the anti-slip portion 28 is provided over an area that overlaps at least with the operation switches 30, 31, 32, 32, 33, 34, and 35 in the vertical direction. This prevents slippage of the palm when operating the operation switches 30 to 35 with the thumb while holding the palm of the right hand against the grip portion 24, so that the operation switches 30 to 35 can be operated securely.

As shown in FIG. 8 and FIG. 12, the back surface 24b of the grip portion 24 is also provided with other operation switches 36, which are different from the operation switches 30, 31, 32, 34, and 35 provided in the operating portion 25. The operation switch 36 provided on the back surface 24b of the grip portion 24 is a push button switch.

The operation switch 36 is a shuttle traction switch that switches the operation of the operation switch 30, which is a shuttle switch, to allow or disallow the operation of the operation switch 30. By operating the operation switch (shuttle check switch) 30 while pressing the operation switch (shuttle check switch) 36, the operation switch (shuttle switch) 30 can be switched between forward and backward.

The operation switch 36 is arranged in the upper corner portion 24n on the opposite (right) side of the operator seat 10 on the back surface 24b of the grip portion 24. The upper corner portion 24n is located behind the corner edge portion 24k of the curved surface 24a of the grip portion 24 and is connected to the corner edge surface 24g.

As shown in FIG. 8 and FIG. 10, the operation switch 36 does not protrude from the back surface 24B. Thus, it is possible to prevent unintentionally pressing the operation switch 36 when operating the operation lever 21 by grasping the grip portion 24. It is also possible to prevent the operation feeling when operating the operation lever 21 by grasping the grip portion 24 from being spoiled by the operation switch 36.

As shown in FIG. 8 and FIG. 12, a circular ridge 24b1 is formed on the back surface 24b around the operation switch 36. The surface of the operation switch 36 is arranged in a concave position with respect to the inner periphery edge of the bulging portion 24b1. The bulging portion 24b1 is raised so that it gradually rises from the outer periphery to the inner periphery (on the side of the operation switch 36). This allows the finger to slide along the bulging portion 24b1 to naturally guide the finger to the operation switch 36.

As shown in FIG. 8 and FIG. 12, a guiding concave portion 37 is provided on the back surface 24b of the grip portion 24 to guide a finger toward the operation switch 36. The operation switch 36 is operated by an index finger of the right hand when the grip portion 24 is gripped with the right hand. The guide concave portion 37 guides the index finger of the right hand gripping the grip portion 24 toward the operation switch 36.

The guiding concave portion 37 is formed recessed from the back surface 24b of the grip portion 24. The guide concave portion 37 has a deepest portion 37a most deeply recessed from the back surface 24b, and an inclining portion 37b formed around the deepest portion 37a. The inclining portion 37b is inclined so that it becomes progressively deeper as it approaches the deepest portion 37a. The inclining portion 37b is connected to the outer edge of the bulging portion 24b1 in the upper right-hand corner. By moving the finger along the inclining portion 37b, the finger is guided to the outer edge of the ridge 24b1 and is guided by the ridge 24b1 towards the operation switch 36.

The guide concave portion 37 extends elongatedly from upward (forward) to downward (rearward) at the back surface 24b of the grip portion 24. The outer edge portion 37c of the guide concave portion 37 forms a closed region at the back surface 24b of the grip portion 24. Of the outer edge portion 37c of the guide concave portion 37, the lower edge reaches the lower edge of the back surface 24b and extends to the back surface of the rearward portion 26A of the extending portion 26. Of the outer edge portion 37c of the guide concave portion 37, the upper edge, the left edge, and the right edge of the guide concave portion 37, the upper edge, the left edge, and the right edge of the back surface 24b, respectively, are located inside the upper edge, the left edge, and the right edge of the back surface 24b.

Thereby, on the back surface 24b of the grip portion 24, an non-recessed region 24p is formed outside the closed region formed by the outer edge portion 37c of the guide concave portion 37. The non-recessed region 24p is around (outside) the outer edge portion 37c of the guiding concave portion 37.

<Elbow Rest>

Next, the elbow rest 18 will be described below.

The elbow rest 18 is the portion where an operator seated on the operator seat 10 places his elbow. The elbow rests 18 include, in whole or in part (at least the upper surface), a cushioning material.

As shown in FIG. 2 to FIG. 6, the elbow rests 18 are provided at the rear portion of the armrest 15. The elbow rest 18 is attached to the main body 16 of the armrest 15 and covers the rear portion of the upper surface 16a of the main body 16.

The elbow rest 18 is arranged behind the operation lever 21. As shown in FIG. 4, the operation lever 21 is displaced to the right with respect to the center of the machine width direction of the elbow rest 18. In other words, in the machine width direction, the left end of the operation lever 21 (the left end of the grip 23) is located more to the right than the left end of the elbow rest 18, and the right end of the operation lever 21 (the right end of the grip 23) is located more to the right than the right end of the elbow rest 18.

The elbow rest 18 has an upper surface 18a, a left side surface 18b, a right side surface 18c, a front surface 18d, and a rear surface 18e. The upper surface 18a is arranged above the upper surface 16a of the main body 16. The upper surface 18a is a substantially flat surface that slopes downwardly from front to rear.

The front surface 18d is a surface extending downwardly from the front portion of the upper surface 18a and inclined to transition forward as it extends downwardly. The rear surface 18e is a surface extending downwardly from the rear portion of the upper surface 18a and inclined to transition backwardly as it extends downwardly.

The left side surface 18b is a surface extending downwardly from the left portion of the upper surface 18a and sloping downwardly to transition to the left as it extends downwardly. The left side surface 18b is located further to the left than the left side surface 16c of the main body 16. The right side face 18c is a face extending downwardly from the right part of the top face 18a and is inclined to transition to the right as it extends downwardly.

An inclining surface 18f is provided at the front portion of the elbow rest 18, which slopes downwardly from the upper surface 18a to the operation tool arrangement portion 19. The inclining surface 18f is provided in the right front portion of the elbow rest 18. The inclining surface 18f is provided on the side (right side) where the concave portion 15a of the elbow rest 18 is provided in the width direction of the armrest 15 (in the machine width direction). The right edge of the inclining surface 18f is connected to the right side surface 18c.

In the width direction of the armrest 15 (in the machine width direction), the length (width) of the inclining surface 18f is set to be more than half the length (width) of the armrest 15. As shown in FIG. 13, the inclining surface 18f extends in the width direction of the armrest 15 over an area (from one side upper surface 15A to the middle upper surface 15B) where it overlaps the sixth front operation tool 66 to the tenth front operation tool 70, which is described below.

Thus, by providing an inclining surface 18f at the front portion of the armrest portion 18 that slopes downwardly toward the operation tool arrangement portion 19, access to the operation tools arranged in the operation tool arrangement portion 19 at a lower position than the armrest portion 18 is facilitated, and the operability of these operation tools is improved. In particular, the operability of the operation tools (sixth front operation tool 66 to tenth front operation tool 70) located on the side (right side) where the inclining surface 18f is provided is greatly improved.

As shown in FIG. 4, the inclining surface 18f is provided in an area that overlaps with the concave portion 15a in the front-to-back direction. In detail, the inclining surface 18f is provided in an area between the front end and the rear end of the concave portion 15a in the front-to-back direction.

As shown in FIG. 3 and FIG. 6, the elbow rest 18 is connected to the main body 16 by a hinge 38 at the bottom of the right side surface 18c. This allows the elbow rest 18 to be pivoted upwardly with the hinge 38 as a fulcrum. By turning the elbow rest 18 upwardly, the elbow rest 18 can be withdrawn to the upper right of the main body 16. This allows the upper surface 16a of the rear portion of the main body 16, which was covered with the elbow rest portion 18, to be opened, as shown in FIG. 15.

Figure 15:
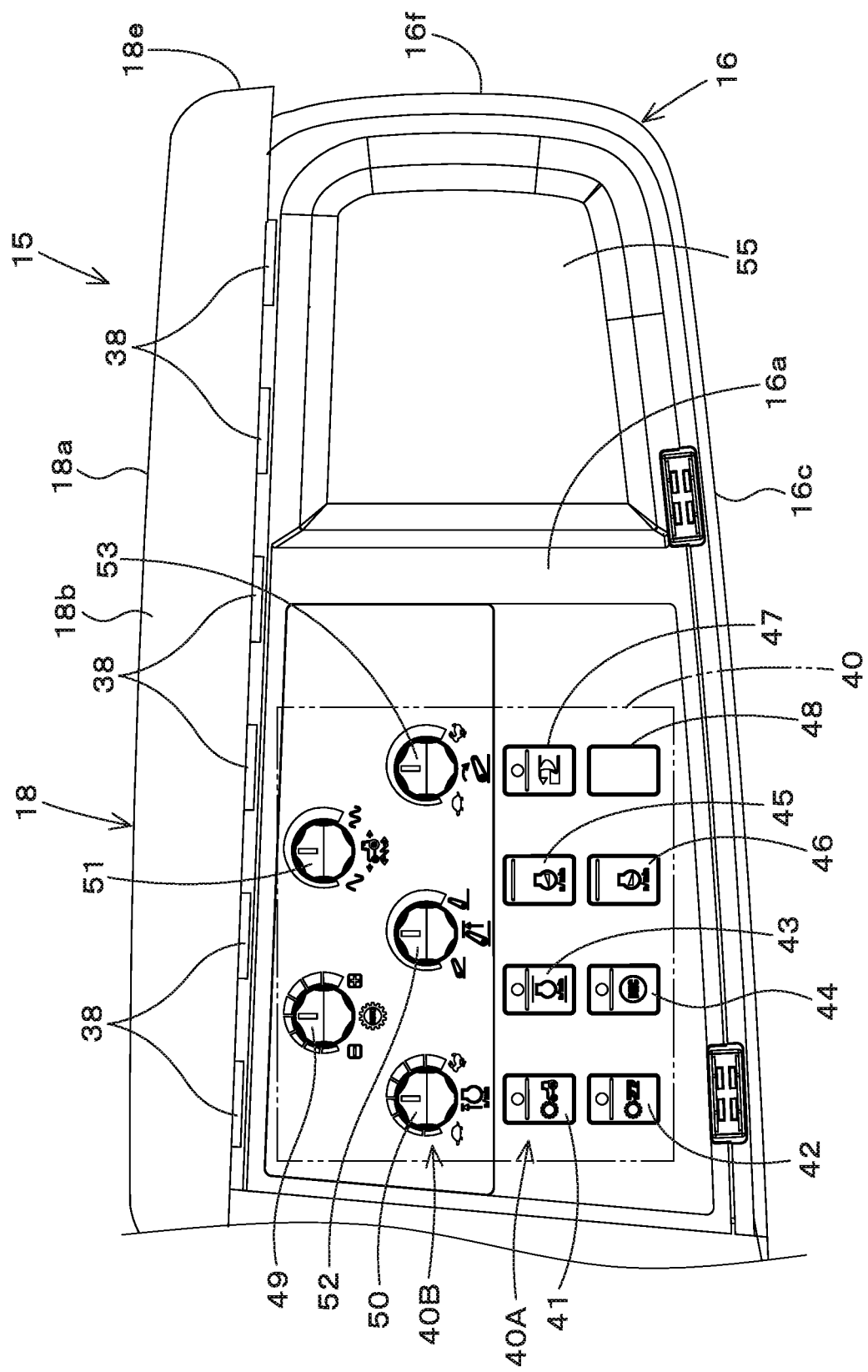
FIG. 15 is a plan view illustrating an elbow rest of an armrest, the elbow rest being opened according to the embodiment.
Figure 16:
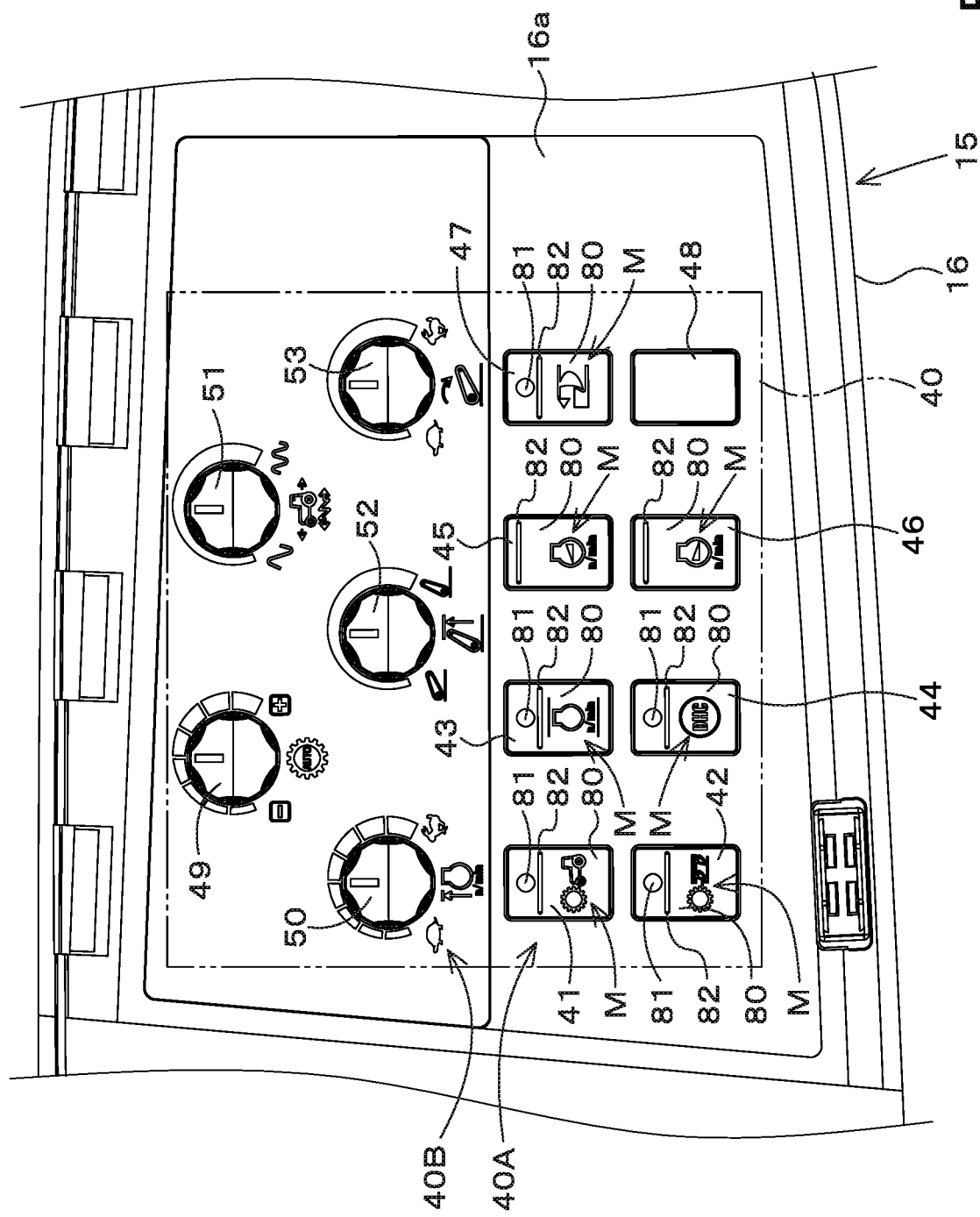
FIG. 16 is a plan view illustrating a rear operation tool group according to the embodiment.

As shown in FIG. 15 and FIG. 16, a plurality of operation tools are provided on the upper surface 16a of the rear side of the main body 16 covered with the armrest section 18. The plurality of operation tools will be referred to hereafter as the "rear operation tool group 40".

In FIG. 15, the rear operation tool group 40 is shown surrounded by a virtual line (double-dotted line) with a sign 40. The rear operation tool group 40 is arranged at the rear portion of the main body 16. The rear operation tool group 40 is covered with the elbow rest 18 when the elbow rest 18 is in use and becomes exposed and operable when the elbow rest 18 is opened.

The rear operation tool group 40 includes an operation tool group 40A and an operation tool group 40B, which are different from each other in operation mode. For convenience of explanation, the operation tool group 40A will be referred to as "third operation tool group 40A" and the operation tool group 40B as "fourth operation tool group 40B".

The third operation tool group 40A includes a plurality of operation tools that are operated by pressing. In particular, the third group of operation tools 40A includes a first rear operation tool 41, a second rear operation tool 42, a third rear operation tool 43, a fourth rear operation tool 44, a fifth rear operation tool 45, a sixth rear operation tool 46, a seventh rear operation tool 47, and an eighth rear operation tool 48. The first rear operation tool 41 to the eighth rear operation tool 48 are push-button switches (tactile switches) operated in a pressing manner.

The fourth operation tool group 40B includes a plurality of operation tools that are operated by rotation around a vertical axis (the vertical axis). In particular, the fourth group of operation tools 40B includes a ninth rear operation tool 49, a tenth rear operation tool 50, an eleventh rear operation tool 51, a twelfth rear operation tool 52, and a thirteenth rear operation tool 53. The ninth rear operation tool 49 through the thirteenth rear operation tool 53 are rotary dials that are operated by rotation around a vertical axis.

The third operation tool group 40A (the first rear operation tool 41 to the eighth rear operation tool 48) is arranged on the left part (on the operator seat 10 side) of the upper surface 16a of the main body 16. The fourth operation tool group 40B (the ninth to the thirteenth rear operation tools 49 to the thirteenth rear operation tools 53) is arranged on the right side (opposite to the operator seat 10 side) of the upper surface 16a of the main body 16.

That is, the third operation tool group 40A (the first rear operation tool 41 to the eighth rear operation tool 48), which are push-button switches, are located on the left part of the upper surface 16a (on the operator seat side), and the fourth operation tool group 40B (the ninth rear operation tool 49 to the thirteenth rear operation tool 53), which are rotary dials, are located on the right part of the upper surface 16a (on the opposite side of the operator seat 10). This allows an operator seated on the operator seat 10 to easily operate the push-button switches and rotary dials by natural movements of the fingers.

The first rear operation tool 41 is a mode switching switch for automatic speed-shifting, which, when pressed, becomes an automatic speed-shifting mode suitable for traveling. The second rear operation tool 42 is a mode switch for automatic shifting, which, when pressed, becomes an automatic shifting mode suitable for field working. The third rear operation tool 43 is an on/off switch for a control mode that maintains a constant engine speed.

The fourth rear operation tool 44 is a DHC switch, which facilitates speed-shift operation according to the load of the engine. The fifth rear operation tool 45 and the sixth rear operation tool 46 are engine memory adjustment switches, which adjust the number of revolutions (first and second revolutions) set by the engine speed memory switch (operation switches 34 and 35).

In particular, the fifth rear operation tool 45 decreases the set speed and the sixth rear operation tool 46 increases the set speed. The seventh rear operation tool 47 is a changeover switch to switch between draft control and position control. The eighth rear operation tool 48 is a reserve switch, to which functions are added as needed.

As shown in FIG. 15 and FIG. 16, the first and second rear operation tools 41 and 42, the third and fourth rear operation tools 43 and 44, the fifth and sixth rear operation tools 45 and 46, and the seventh and eighth rear operation tools 47 and 48 are each aligned in the width direction of the armrest 15.

The first rear operation tool 41, the third rear operation tool 43, the fifth rear operation tool 45, and the seventh rear operation tool 47 are aligned in the front-to-back direction. The second rear operation tool 42, the fourth rear operation tool 44, the sixth rear operation tool 46, and the eighth rear operation tool 48 are aligned in the front-to-back direction.

The ninth rear operation tool 49 is a rotary dial for adjusting the sensitivity of the automatic speed-shifting mode. The tenth rear operation tool 50 is a rotary dial for setting the upper limit of the engine speed. The eleventh rear operation tool 51 is a rotary dial for adjusting the draft ratio. The twelfth rear operation tool 52 is a rotary dial for adjusting the upper limit of the 3P (a lift arm). The thirteenth rear operation tool 53 is a rotary dial for adjusting the drop speed of the working device.

A plurality of rear operation tools included in the rear operation tool group 40 are, in principle, operation tools that are not used while traveling. The rear operation tool group 40 is covered with the elbow rest 18 when the working vehicle 1 is traveling, thus preventing it from being unintentionally touched and operated while traveling.

Since the rear operation tool group 40 need only be used after the working vehicle 1 stops traveling and the elbow rest 18 is released, the operability of the rear operation tool group 40 is not degraded even when it is covered with the elbow rest 18 during traveling. However, the specific types and number of specific rear operation tools included in the rear operation tool group 40 are not limited to the types and number of rear operation tools described above.

As shown in FIG. 15, a storage portion 55 is provided behind the rear portion of the rear operation tool group 40. The storage portion 55 has a space recessed from the upper surface 16a of the main body 16, and the space can store items such as a smartphone (multifunctional mobile phone), for example, in the space. The storage portion 55 is covered with the armrest portion 18 when the armrest portion 18 is in use, and items can be put in and out of the armrest portion 18 when the armrest portion 18 is open.

<Operation Tool Arrangement Portion>

As shown in FIGS. 2 to 6 and FIG. 13, a plurality of operation tools are arranged in the operation tool arrangement portion 19. The plurality of operation tools arranged in the operation tool arrangement portion 19 will be referred to as the "front operation tool group 60". In FIG. 13, the front operation tool group 60 is shown surrounded by a virtual line with a reference numeral "60".

The front operation tool group 60 is arranged in front of the rear operation tool group 40. The operation tool included in the front operation tool group 60 arranged in the operation tool arrangement portion 19 is an operation tool that is operated more frequently than the operation tool included in the rear operation tool group 40, which is covered with the elbow rest 18.

The operation tool arrangement portion 19 is provided at a position near the front portion of the armrest 15. In particular, the operation tool arrangement portion 19 is provided behind the swinging operation portion 17 and in front of the armrest portion 18. In other words, the operation tool arrangement portion 19 is provided between the swinging operation portion 17 and the armrest 18.

Figure 14:
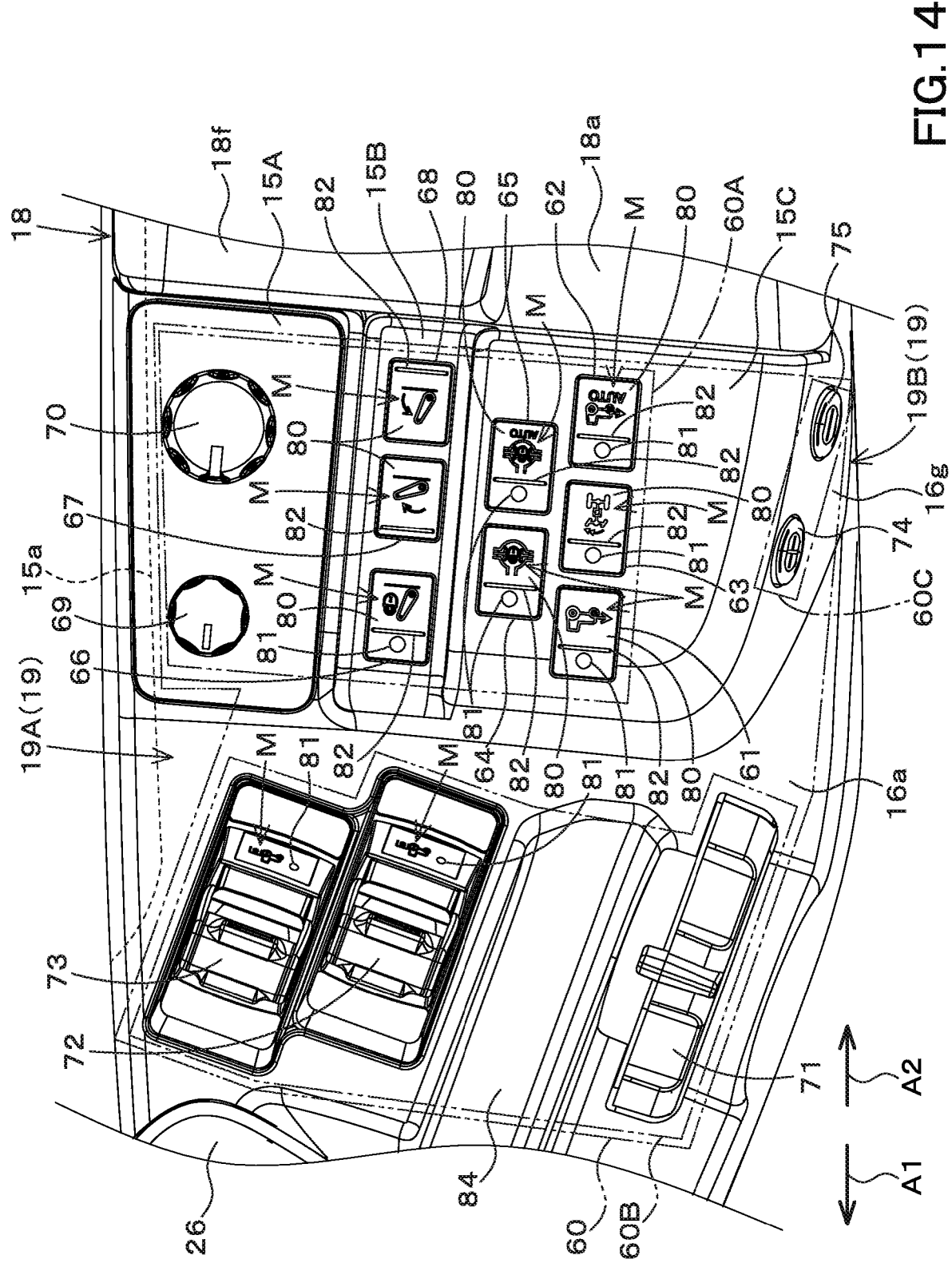
FIG. 14 is a plan view illustrating an operation tool arrangement portion according to the embodiment.

As shown in FIG. 13 and FIG. 14, the operation tool arrangement portion 19 includes a first arrangement portion 19A on the upper surface 16a of the main body 16 of the armrest 15 and a second arrangement portion 19B on a side (left side surface 16c) of the main body 16 of the armrest 15. The first arrangement portion 19A is located on a upper surface of the upper surface 16a of the main body 16, which is located between the swing operating portion 17 and the armrest 18. The second arrangement portion 19B is located on a side surface (left side surface 16C) of the main body 16 that is in the portion of the side surface (partial side surface 16G as described below) that is located between the swing operating portion 17 and the elbow rest 18.

As shown in FIG. 14, the front operation tool group 60 includes a first operation tool group 60A, a second operation tool group 60B, and a third operation tool group 60C. In FIG. 14, the first operation tool group 60A is shown with a virtual line with a sign 60A, the second operation tool group 60B is shown with a virtual line with a sign 60B, and the third operation tool group 60C is shown with a virtual line with a reference numeral "60C".

A first group of operation tools 60A is arranged at the rear portion of the first arrangement portion 19A of the operation tool arrangement portion 19. A second group of operation tools 60B is arranged in front of the first arrangement portion 19A of the operation tool arrangement portion 19.

That is, in the first arrangement portion 19A of the operation tool arrangement portion 19, the second operation tool group 60B is arranged forward of the first operation tool group 60A. The third group of operation tools 60C is arranged in the second arrangement portion 19B of the operation tool arrangement portion 19. The third operation tool group 60C is aligned in the width direction of the armrest 15 and is arranged behind the second operation tool group 60B in the front-to-back direction.

First, the first operation tool group 60A will be described below.

As shown in FIG. 14, the first group of operation tools 60A includes a first front operation tool 61, a second front operation tool 62, a third front operation tool 63, a fourth front operation tool 64, a fifth front operation tool 65, a sixth front operation tool 66, a seventh front operation tool 67, an eighth front operation tool 68, a ninth front operation tool 69, and a tenth front operation tool 70.

The first front operation tool 61 to the eighth front operation tool 68 are push button switches (tactile switches) as a push operation tool. In other words, the first group of operation tools 60A includes a plurality of operation tools that are operated in a pressing manner. In detail, the first front operation tools 61 to the fifth front operation tool 65 are the traveling push operation tools that are operated in a pressing manner. Sixth front operation tools 66 to eighth front operation tools 68 are working push operation tools that perform operations related to work in a pressing manner.

The first front operator 61 is a 2WD/4WD switch (manual), which can be pressed to switch between 2WD and 4WD. The second front operation tool 62 is a 2WD/4WD switch (automatic), which can be pressed to automatically switch between 2WD and 4WD according to the vehicle speed and steering angle of the front wheels.

The third front operation tool 63 is a double speed switch, which, when pressed, enables the front wheel to be turned faster for a small turn when turning. The fourth front operation tool 64 is a differential-locking switch (manually). The fifth front operation tool 65 is a differential-locking switch (automatically).

The sixth front operation tool 66 is a 3P link lock switch, which can be pressed to lock the lifter device 4 so that the working device cannot be lowered. The seventh front operation tool 67 and the eighth front operation tool 68 are one-touch switches that drive the lifter device 4 to raise and lower the working device. When the seventh front operation tool 67 is pressed, the lifter device 4 lowers the working device. When the eighth front operation tool 68 is pressed, the lifter device 4 raises the working device.

The first front operation tool 61 to the sixth front operation tool 66 have a push operation portion 80, a display portion 81 and a protrusion 82, respectively. The operation tool having a push operating portion 80, a display 81 and a protrusion 82 may be referred to hereafter as "one operation tool".

The first front operation tool 61 to the sixth front operation tool 66 (one operation tool) is rectangular in shape having a longitudinal direction (long side) and a widthwise direction (short side) in plan view. In this embodiment, the longitudinal direction is in the front-to-back direction and the widthwise direction is in the machine width direction. The display portion 81, the protrusion 82, and the pressure control portion 80 are arranged in this order from front to rear.

The push operating portion 80 is a portion that is operated in a pressing manner. The push operating portion 80 is a pushable (moveable in a pressing manner) portion provided on the other side (rear side) in the longitudinal direction than the protrusion 82. A symbolic mark (design) M representing the contents of the operation is marked on the push operating portion 80. The first front operation tool 61 to the sixth front operation tool 66 are marked with different symbols M.

The display portion 81 is an unpushable (does not move if pressed) portion provided on one side of the longitudinal direction of the first front operation tool 61 to the sixth front operation tool 66 (the one operation tool). The display portion 81 indicates whether the first front operation tool 61 to the sixth front operation tool 66 (the one operation tool) is in an operative or non-operative state.

The operative state is the state in which the push operating portion 80 is pressurized (exerting a function). The inoperative state is the state in which the push operating portion 80 is not pressurized (exerting no function). The display portion 81 includes a lamp such as an LED or the like that can be lit. The lamp including the display portion 81 is lit in the operative state and is turned off in the non-operative state.

In other words, the display portion 81 is an indicator that indicates whether the first front operation tool 61 to the sixth front operation tool 66 (one operation tool) is in an operative or non-operative state by switching the light on or off.

By seeing whether the display portion 81 is in the on or off state, the operator can see whether the first front operation tool 61 to the sixth front operation tool 66 (one operation tool) is in an operational or non-operational state. In other words, by switching the display of the display portion 81, feedback about the operation can be communicated to the operator (the operator).

The symbol mark M of the press operation portion 80 is transparent, and the light of the lamp including the display portion 81 transmits through the symbol mark M. The symbol mark M is visible even at night. This allows the symbol mark M to be visible even at night.

The protrusion 82 is provided between the push operating portion 80 and the display portion 81 and partitions the push operating portion 80 and the display portion 81. The protrusion 82 extends in a straight line between the pressing operation portion 80 and the display portion 81. The protrusion 82 separates the symbol mark M and the lamp. In other words, the protrusion 82 is provided between the symbol mark and the lamp.

The above-mentioned first to fourth rear operation tools 41 to 44 and the seventh rear operation tools 47 are included in the "single operation tools" because they have a pressing operation portion 80, a display portion 81 and a protrusion 82. The first to fourth rear operation tools 41 to 44 and the seventh rear operation tool 47 have a rectangular shape having a longitudinal direction (long side) and a widthwise direction (short side) in plan view, with the widthwise direction being in the front-to-back direction and the longitudinal direction being in the machine width direction. The display portion 81, the protrusion 82 and the pressurized control portion 80 are arranged in this order from right to left.

The seventh and eighth front operation tools 67 and 68 have a push operation portion 80 and a protrusion 82, respectively, but do not have a display portion 81. Hereinafter, an operation tool having a push operation tool 80 and a protrusion 82 but without an indication 81 may be referred to as "other operation tool". The fifth rear operation tool 45 and the sixth rear operation tool 46 are also included in "other operation tools".

The protrusions 82 of the seventh front operation tool 67 and the eighth front operation tool 68 (other operation tools) are provided at a different position from the protrusions 82 of the first front operation tool 61 to the sixth front operation tool 66 (the one operation tool). In particular, the protrusions 82 of the seventh front operation tool 67 and the eighth front operation tool 68 (the other operation tool) are located farther from the symbol mark M than the protrusions 82 of the first front operation tool 61 to the sixth front operation tool 66 (the one operation tool).

The protrusions 82 of the seventh front operation tool 67 and the eighth front operation tool 68 (the other operation tools) are closer to the longitudinal (front-to-back direction) edge (front or rear edge) of the operation tool than the protrusions 82 of the first front operation tool 61 to the sixth front operation tool 66 (the one operation tool).

The protrusions 82 provided in the seventh front operation tool 67 and the protrusions 82 provided in the eighth front operation tool 68 are different in position in the longitudinal direction (front and rear) of the operation tool. In particular, the protrusion 82 provided in the seventh front operation tool 67 is located on one side (front side) of the longitudinal direction of the operation tool, while the protrusion 82 provided in the eighth front operation tool 68 is located on the other side (rear side) of the longitudinal direction of the operation tool. In other words, in the seventh and eighth front operation tool 67 and the eighth front operation tool 68, the protrusions 82 are positioned in opposite directions to each other.

The seventh front operation tool 67 and the eighth front operation tool 68 are operation tools for operating the working device in opposite directions to each other. In particular, the seventh front operation tool 67 and the eighth front operation tool 68 are operation tools (one-touch switches) for moving (raising or lowering) the working device in opposite directions to each other. Accordingly, in the operation tools for operating in opposite directions to each other (the seventh front operation tool 67 and the eighth front operation tool 68), the protrusions 82 are arranged in opposite directions to each other.

This makes it possible for the operator (driver) to intuitively check the position of the protrusion 82 visually or with his fingertips to grasp the contents of the operation by the operation tools (seventh front operation tool 67, eighth front operation tool 68).

The seventh front operation tool 67, which is an operation tool for lowering the working device, and the eighth front operation tool 68, which is an operation tool for raising the working device, are arranged side by side in the front-to-back direction. In particular, the seventh front operation tool 67 is arranged in the front and the eighth front operation tool 68 is arranged in the rear.

The protrusion 82 of the forwardly arranged seventh front operation tool 67 is located at the front portion of the operation tool, and the protrusion 82 of the rearwardly arranged eighth front operation tool 68 is located at the rear portion of the operation tool, so that the space between the protrusion 82 of the seventh front operation tool 67 and the protrusion 82 of the eighth front operation tool 68 is wide.

This enables the protrusion 82 of the seventh front operation tool 67 and the protrusion 82 of the eighth front operation tool 68 to be clearly distinguishable visually or by tactile sense of the fingertips. As a result, it is possible to clearly distinguish the two operation tools 67 and 68 and reduce the risk of mis-operation.

In addition, the operator can intuitively determine the type of operation tool by the difference in the position of the protrusion 82 and the presence or absence of the display portion 81 as described above, thereby improving the operability.

The ninth front operation tool 69 and the tenth front operation tool 70 are rotary operation tools that perform work-related operations by rotation around a vertical axis. In other words, the front operation tool group 60 includes rotary operation tools (the ninth front operation tool 69 and the tenth front operation tool 70) that perform work-related operations by rotation around a vertical axis. The rotary operation tools 69 and 70 are arranged at the right rear portion of the operation tool arrangement portion 19. The ninth front operation tool 69 is an adjustment dial for the draft ratio. The tenth front operation tool 70 is a tillage depth adjustment dial that drives the lifter device 4 to adjust the working depth (tillage depth by the cultivator) by the working device.

As shown in FIG. 13 and FIG. 14, the surface (upper surface 16A) of the armrest 15 includes one side upper surface 15A, an middle upper surface 15B and the other side upper surface 15C. The upper surface 15A on one side, the middle upper surface 15B and the upper surface 15C on the other side are provided in the operation tool arrangement portion 19.

In other words, the upper surface on which the operation tool arrangement portion 19 is provided has a one-side upper surface 15A, an middle upper surface 15B, and a upper surface 15C on the other side. The one side upper surface 15A, the middle upper surface 15B and the other side upper surface 15C are the areas of the operation tool arrangement portion 19 where the first operation tool group 60A is arranged at the rear portion of the first arrangement portion 19A.

One side upper surface 15A is an area provided on the operator seat 10 side (opposite the side on which the concave portion 15A is provided). The upper surface 15C on the other side is an area on the operator seat 10 side (opposite the side where the concave portion 15A is provided). The middle upper surface 15B is a region provided between the upper surface 15A on one side and the upper surface 15C on the other side.

Figure 2:
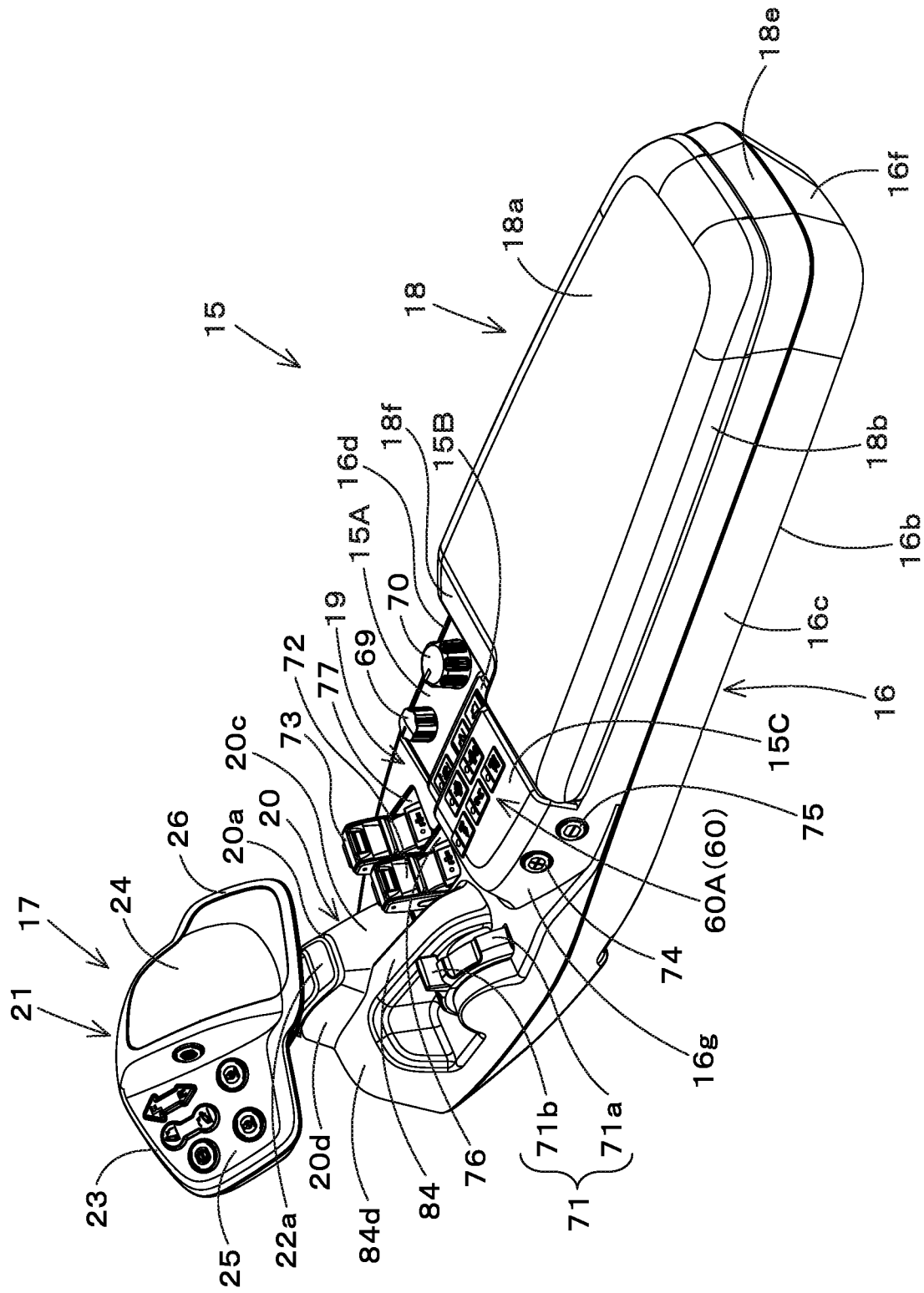
FIG. 2 is an oblique view illustrating an armrest seen from the upper-left rear according to an embodiment.

As shown in FIG. 2 and FIG. 3, the upper surface 15A on one side, the middle upper surface 15B and the upper surface 15C on the other side are different in height from each other. In particular, the middle upper surface 15B is higher than the one side upper surface 15A and lower than the other side upper surface 15C. That is, the one side upper surface 15A, the middle upper surface 15B, and the other side upper surface 15C are formed in a staircase shape, with the one side upper surface 15A being the lowest, the middle upper surface 15B being the next lowest, and the other side upper surface 15C being the highest.

Thus, the upper surface 16A on which the operation tool arrangement portion 19 is provided is lower in the width direction of the armrest 15 than the height of the region on the side where the concave portion 15A is provided (one side upper surface 15A) compared to the height of the region opposite the side where the concave portion 15A is provided (other side upper surface 15C). The height of the middle upper surface 15B is roughly equal in height to the height of the lower end (front end) of the sloping surface 18f of the elbow rest 18.

On one side upper surface 15A and the middle upper surface 15B, work-related operation tools (sixth front operation tool 66 to tenth front operation tool 70) are arranged for work-related operations. In the middle upper surface 15B, work-related operation tools, from the sixth to the eighth front operation tools 66 to 68, are arranged in the middle upper surface 15B. The ninth and tenth front operation tools 69 and 70 are arranged on one side upper surface 15A. On the other upper surface 15C, the traveling system operation tools that perform operations related to traveling are arranged.

In particular, on the other side upper surface 15C, the travel system pressing operation tool (first front operation tool 61 to fifth front operation tool 65) is arranged.

Thus, a plurality of areas of different heights (one side upper surface 15A, middle upper surface 15B, and other side upper surface 15C) are provided on the upper surface where the operation tool arrangement portion 19 is provided, and operation tools having different functions are divided into a plurality of areas. As a result, the operator can distinguish the operation tools by the height of the upper surface on which the operation tools are provided, and thus can easily distinguish the operation tools visually. It is also possible to identify the operation tool by recognizing its height with a finger without relying on sight.

The first front operation tool 61 to the fifth front operation tool 65 are arranged on an upper surface at the same height (upper surface 15C on the other side). This improves the operability of the operations related to driving. The sixth front operation tool 66, the seventh front operation tool 67 and the eighth front operation tool 68 are arranged on an upper surface (middle upper surface 115B) at the same height. This improves the operability of the operation regarding the lifter device 4.

Next, the second operation tool group 60B will be described below.

As shown in FIG. 14, the second group of operation tools 60B includes an eleventh front operation tool 71, a twelfth front operation tool 72, and a thirteenth front operation tool 73. The eleventh front operation tool 71 is an operation tool that is rotated around a horizontal axis (a horizontal axis extending in the direction of an substantially body width). The twelfth front operation tool 72 and the thirteenth front operation tool 73 are operation tools that are pivoted around a lateral axis (a horizontal axis extending in the direction of the width of the vehicle). In other words, the second operation tool group 60B includes a plurality of operation tools that are operated by rotation or swinging around a horizontal axis.

The eleventh front operation tool 71 is a driving system operation tool that performs operations related to driving by rotation around a horizontal axis and includes a rotation dial. In the case of this embodiment, the eleventh front operation tool 71 is an accelerator dial for increasing or decreasing the number of revolutions of the engine 8.

The twelfth front operation tool 72 and the thirteenth front operation tool 73 are working operation tools that perform work-related operations by swinging around a horizontal axis. In particular, the twelfth front operation tool 72 and the thirteenth front operation tool 73 are PTO clutch operation switches that operate the PTO clutch to connect or disconnect the PTO clutch. The twelfth front operation tool 72 is a rear PTO clutch operation switch. The thirteenth front operation tool 73 is a front PTO clutch operation switch.

The eleventh front operation tool 71, which is a traveling system operation tool, and the twelfth front operation tool 72 and the thirteenth front operation tool 73, which is a working system operation tool, are arranged in the width direction of the armrest 15. The eleventh front operation tool 71, which is a traveling system operation tool, is arranged on the operator seat 10 side. The twelfth front operation tool 72 and the thirteenth front operation tool 73, which is a working operation tool, are arranged on the opposite side of the operator seat 10.

The swinging directions of the twelfth and thirteenth front operation tools 72 and 73, which are working operation tools, and the direction of rotation of the eleventh front operation tool 71, which is a traveling system operation tool, are parallel in plan view.

As shown in FIG. 2 to FIG. 6 and FIG. 13, a protrusion 84 is provided between the traveling system operation tool (eleventh front operation tool 71) and the working system operation tool (twelfth front operation tool 72, thirteenth front operation tool 73). The protrusion 84 is raised to separate the traveling system operation tool (eleventh front operation tool 71) from the working system operation tool (twelfth front operation tool 72, thirteenth front operation tool 73).

The protrusion 84 extends parallel to the direction of swinging of the working system operation tool (twelfth front operation tool 72, thirteenth front operation tool 73) and the direction of rotation of the traveling system operation tool (eleventh front operation tool 71). The height of the protrusion 84 is gradually increased from the rear to the front.

The front portion 84a of the protrusion 84 (the portion forward of the eleventh front operation tool 71, the twelfth front operation tool 72, and the thirteenth front operation tool 73) is connected to a side (left side 20d) of the pedestal 20. The front portion 84a of the protrusion 84 extends forward of the eleventh front operation tool 71. The left edge of the front portion 84a of the protrusion 84 is connected to the left side surface 16c of the main body 16. The front edge of the front portion 84a of the protrusion 84 is connected to the front surface 16e of the main body 16.

Thus, by providing a protrusion 84 between the travel system operation tool (eleventh front operation tool 71) and the working system operation tool (twelfth front operation tool 72, thirteenth front operation tool 73), a protrusion 84 is provided between the travel system operation tool (eleventh front operation tool 71) and the working system operation tool (twelfth front operation tool 72, thirteenth front operation tool 73), which prevents the operation of either the travel system operation tool or the working system operation tool from accidentally coming into contact with either of the other operation tools and causing a mis-operation.

As shown in FIG. 14, the twelfth and thirteenth front operation tools 72 and 73 are provided with a display portion 81. The display portion 81 includes a lamp such as an LED or the like which can be lit. The lamps including the display portion 81 are lit in the operative state and turned off in the non-operative state. In other words, the display portion 81 is an indicator indicating which state the twelfth front operation tool 72 and the thirteenth front operation tool 73 are in in the operative state or the inoperative state by switching the lamp on and off.

By seeing whether the display portion 81 is in the on or off state, the operator can see whether the twelfth front operation tool 72 and the thirteenth front operation tool 73 are in an operational or non-operational state.

The twelfth and thirteenth front operation tools 72 and 73 have a symbol M indicating the contents of the operation next to the display portion 81. The symbol M is transparent, and the light of the lamp including the display portion 81 transmits through the symbol M. This allows the symbol mark M to be visible even at night.

As shown in FIG. 2 and FIG. 3, a first concave portion 76 is provided around the twelfth front operation tool 72. A second concave portion 77 is provided around the thirteenth front operation tool 73. The first and second concave portions 76 and 77 are recessed downwardly with respect to the upper surface 16a of the main body 16. The lower portion of the twelfth front operation tool 72 is located in the first concave portion 76.

The lower portion of the thirteenth front operation tool 73 is located in the second concave portion 77. As a result, the protruding height of the twelfth front operation tool 72 and the thirteenth front operation tool 73 is lower than the protruding height of the twelfth front operation tool 72 and the thirteenth front operation tool 73 from the upper surface 16a. This prevents a hand of a person operating the operation lever 21 from hitting the twelfth front operation tool 72 and the thirteenth front operation tool 73.

As shown in FIG. 2, the eleventh front control device (accelerator dial) 71 has a rotor body 71a and a pinching portion 71b. The rotor body 71a protrudes in an upwardly convex arc from the upper surface of the armrest 15 in a side view. The pinching portion 71b protrudes from a upper surface of the rotor body 71a.

The rotor body 71a is rotatable around a lateral (horizontal) fulcrum located inside the armrest 15. By plucking the pinching portion 71b and moving it forward or backward, the rotor body 71a is rotated around the pivot axis. When the pinching portion 71b is moved forward, the speed of the engine 8 is increased by moving the pinching portion 71b forward. When the pinching portion 71b is moved backwards, the rotational speed of the engine 8 is reduced.

The front operation tool group 60 and the rear operation tool group 40 may be arranged on separate boards, but they can be arranged on one board. In detail, all of the front operation tools group 60 and all of the rear operation tools group 40 can be arranged on a single board.

It is also possible to dispose of a portion of the front operation tool group 60 and a portion of the rear operation tool group 40 on a single board. A portion of the front operation tools group 60 and a portion of the rear operation tools group 40 can be arranged on a single board. Also, a portion of the front operation tools group 60 and a portion of the rear operation tools group 40 can be arranged on one board.

Of the operation tools included in the front operation tool group 60, the rotating operation tools (the ninth front operation tool 69 and the tenth front operation tool 70), which are operated by rotation around a longitudinal axis, are arranged in an area on one side (opposite the operator seat 10 side) of the upper surface 16a of the main body 16 of the armrest 15.

Of the operation tools included in the rear operation tool group 40, the rotary operation tools that are operated by rotation of the longitudinal axis (the ninth rear operation tool 49 to the thirteenth rear operation tool 53) are also arranged in an area on one lateral side of the upper surface 16a (opposite to the operator seat 10). That is to say, the rotary operation tools which are operated by rotation of the longitudinal axis are arranged in an area on one side of the upper surface 16a of the main body 16 of the armrest 15, on one side of the upper surface 16a. This allows for a natural and smooth movement of the fingers of the right hand (plucking and turning with the thumb and other fingers) for the operation of the rotation around the vertical axis.

Of the operation tools included in the front operation tool group 60, the pressing operation tools (the first front operation tool 61 to the eighth front operation tool 68), which are operated in a pressing manner, are arranged in the area on the other side (on the operator seat 10 side) of the upper surface 16a of the main body 16 of the armrest 15.

Of the operation tools included in the rear operation tool group 40, the pressing operation tools (the first rear operation tools 41 to the eighth rear operation tool 48), which are operated by pushing, are also arranged in an area on the other side of the upper surface 16a (the operator seat 10 side). That is to say, the push-down operation tools are arranged in an area on the other side of the upper surface 16a of the main body 16 of the armrest 15. This allows for smooth operation of the pressing operation tool because the pressing operation tool is arranged on the side close to the thumb or index finger.

However, the specific types and number of front operation tools included in the front operation tool group 60 are not limited to the types and number of front operation tools described above.

Next, the third operation tool group 60C will be described below.

As shown in FIG. 13 and FIG. 14, the third group of operation tools 60C is arranged alongside the first group of operation tools 60A in the width direction of the vehicle body. The third group of controls 60C includes a fourteenth front operation tool 74 and a fifteenth front operation tool 75. The fourteenth front operation tool 74 and the fifteenth front operation tool 75 are pressing operation tools that perform operations related to traveling in a pushing manner.

In detail, the fourteenth front operation tool 74 and the fifteenth front operation tool 75 are operation switches that cause the speed shifter (main transmission) to perform an increase or decrease in speed in a pressing manner. In particular, the fourteenth front operation tool 74 is an increasing speed switch that performs the acceleration operation in a pressing manner. The fifteenth front operation tool 75 is a deceleration switch that performs a deceleration operation in a pressing manner. These operation switches are push-button switches.

The above controller device controls the drive of the speed shifter (the main transmission) based on the operation of the operation switches (fourteenth front operation tool 74, fifteenth front operation tool 75). In particular, the controller device causes the speed shifter to perform an acceleration operation when the fourteenth front operation tool 74 is pressed, and causes the speed shifter to perform a decreasing operation when the fifteenth front operation tool 75 is pressed.

As described above, the operation lever 21 is a lever that allows the speed shifter (main transmission) to execute an increase or decrease in speed by swinging forward or backward. Thus, the operation switch including the fourteenth front operation tool 74 and the fifteenth front operation tool 75 has the same function (the main transmission function) as the operation lever 21.

Accordingly, the operator can perform the shifting operation that causes the speed shifter (main transmission) to perform an increase or decrease in speed by operating the speed shifter operation lever 21, or by operating the fourteenth front operation tool 74 or fifteenth front operation tool 75. In other words, in the main shifting operation, the operation lever 21 and the operation switches (the fourteenth front operation tool 74 and the fifteenth front operation tool 75) are used selectively.

The operation switches (the fourteenth front operation tool 74 and the fifteenth front operation tool 75) are self-returning switches that automatically return from the operating position (the pressed position) to the non-operating position (the position before pressing) when the operation is stopped. When the operation switches (fourteenth front operation tool 74, fifteenth front operation tool 75) are pressed to the operating position, the speed shifter is turned on and the speed shifter is shifted, and when the hand is removed from the operation switches (fourteenth front operation tool 74, fifteenth front operation tool 75), the operation switches 74 and 75 return to the non-operating position, and the speed shifter is shifted. The speed-shift is turned off and the speed-shift is not executed.

As shown in FIG. 2, FIG. 4, FIG. 5, FIG. 13, and FIG. 14, the fourteenth front operation tool 74 and the fifteenth front operation tool 75 are arranged on the side of the main body 16 of the armrest 15. In particular, the fourteenth front operation tool 74 and the fifteenth front operation tool 75 are arranged on the side of the operator seat 10 of the armrest 15 (the left side surface 16c of the main body 16).

Thus, by having the fourteenth front operation tool 74 and the fifteenth front operation tool 75 arranged on the side of the armrest 15, the operator can operate the tractor 1 without extending the arm forward (without grasping the operation lever 21) to perform acceleration or deceleration when the operator is driving the tractor 1 while looking backward.

For example, when the operator looks back and sees the work situation with the working device connected to the rear portion of the tractor 1 while increasing or decreasing the speed or decelerating the speed, for example, the comfort of the operator's operation can be improved.

The fourteenth front operation tool 74 and the fifteenth front operation tool 75 are arranged behind the operation lever 21 and in front of the elbow rest 18. The fourteenth front operation tool 74 and the fifteenth front operation tool 75 are arranged closer to the elbow rest 18 than the operation lever 21.

Of the side of the operator seat 10 side of the armrest 15 (the left side surface 16c of the main body 16), the side of the portion of the side where the fourteenth front operation tool 74 and the fifteenth front operation tool 75 are arranged ("partial side surface 16g") is connected to the one side upper surface 15A. The upper edge of the partial side surface 16g is connected to the left edge of the one side upper surface 15A. The front edge of the partial side surface 16g is connected to the front edge of the one-side upper surface 15A. The boundary area between the partial side surface 16g and the one-side upper surface 15A is gently curved.

As shown in FIG. 2 and FIG. 5, the partial sides 16g extend from a lower position to an upper position below the upper surface 16a. The partial side surface 16g is inclined to transition away from the operator seat 10 (to the right) as it extends from the rear to the front. The partial side surface 16g is inclined to transition away from the operator seat 10 (to the right) as it extends from the downward to the upward position.

This makes it easy to access the fourteenth front operation tool 74 and fifteenth front operation tool 75 arranged on the partial side surface 16g from above (upper left) on the operator seat 10 side. Thus, the operator (worker) can easily press and manipulate the fourteenth front operation tool 74 and fifteenth front operation tool 75 from the upper left side by extending the thumb of the right hand.

The fourteenth front operation tool (speed increase switch) 74 and the fifteenth front operation tool (deceleration switch) 75 are arranged side by side in the front-to-back direction on the side of the armrest 15 (partial side surface 16g). In particular, the fourteenth front operation tool 74 is arranged in the front and the fifteenth front operation tool 75 is arranged in the rear portion of the armrest 15.

This allows selective operation of the fourteenth front operation tool (acceleration switch) 74 and the fifteenth front operation tool (deceleration switch) 75 by simply moving the thumb back and forth.

The fourteenth front operation tool 74 and the fifteenth front operation tool 75 are arranged with the forwardly located switch above the rearwardly located switch. In other words, the fourteenth front operation tool 74 is arranged above the fifteenth front operation tool 75.

As a result, the operation switch (fourteenth front operation tool 74) arranged on the side (front) far from the elbow rest 18 is positioned upwardly, making it easier for the thumb to reach the operation switch (fourteenth front operation tool 74) and improving the operability.

As shown in FIG. 4, the swinging shaft (swing body 22) of the operation lever 21 is located closer to the side opposite the operator seat 10 (right side surface 16d of the main body 16) than to the side of the operator seat 10 (left side surface 16c of the main body 16) of the armrest 15. In other words, the pivot axis (swing body 22) of the operation lever 21 is displaced in the machine width direction opposite the partial side surface 16g where the fourteenth front operation tool 74 and fifteenth front operation tool 75 are arranged.

This allows the operation levers 21 and the operation switches (fourteenth front operation tool 74, fifteenth front operation tool 75), which have the same function, to be placed apart from each other to encourage selective use.

Figure 19:
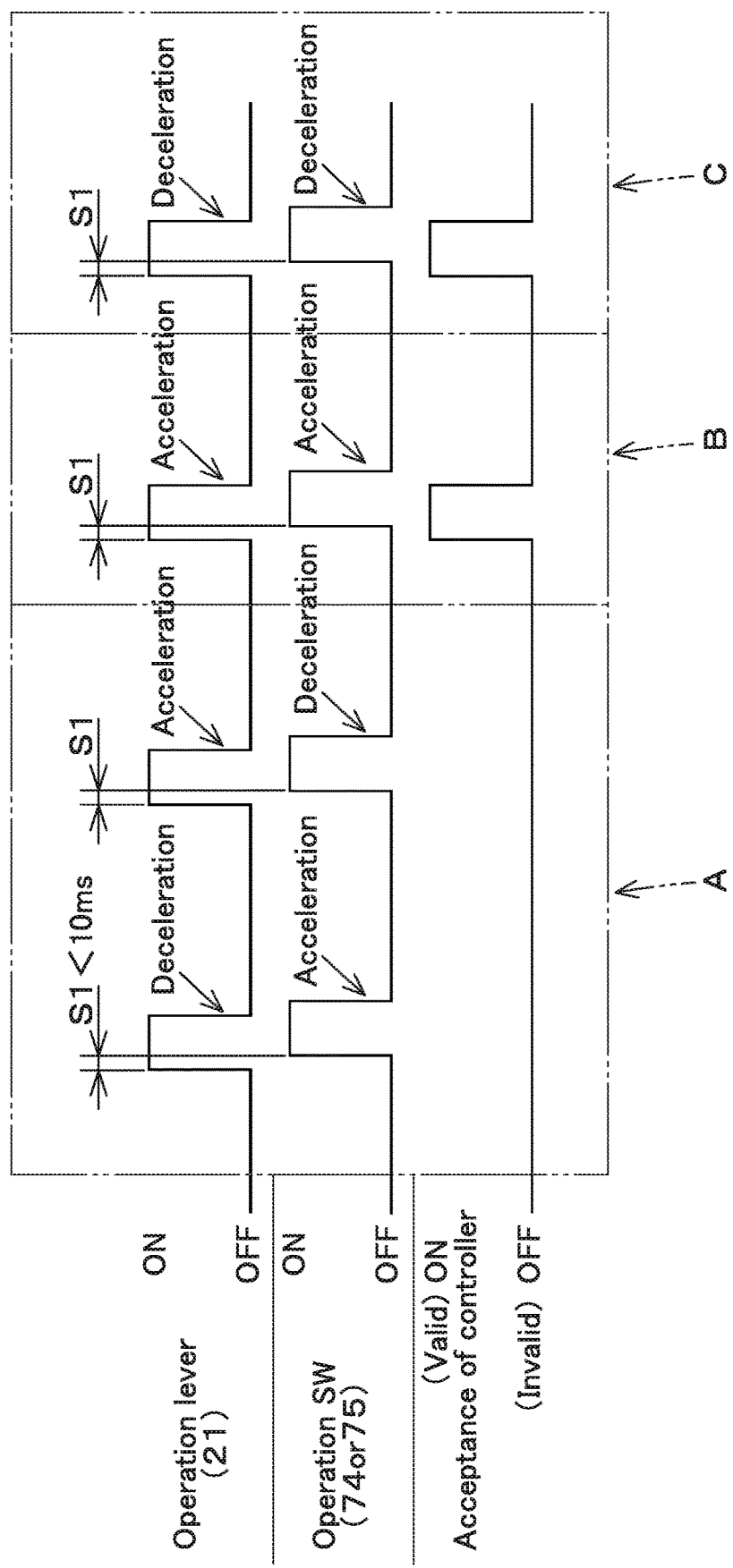
FIG. 19 is a view illustrating a relation between an operation of a speed shifting device and acceleration or deceleration operations of an operation lever and an operation switch according to the embodiment.
Figure 20:
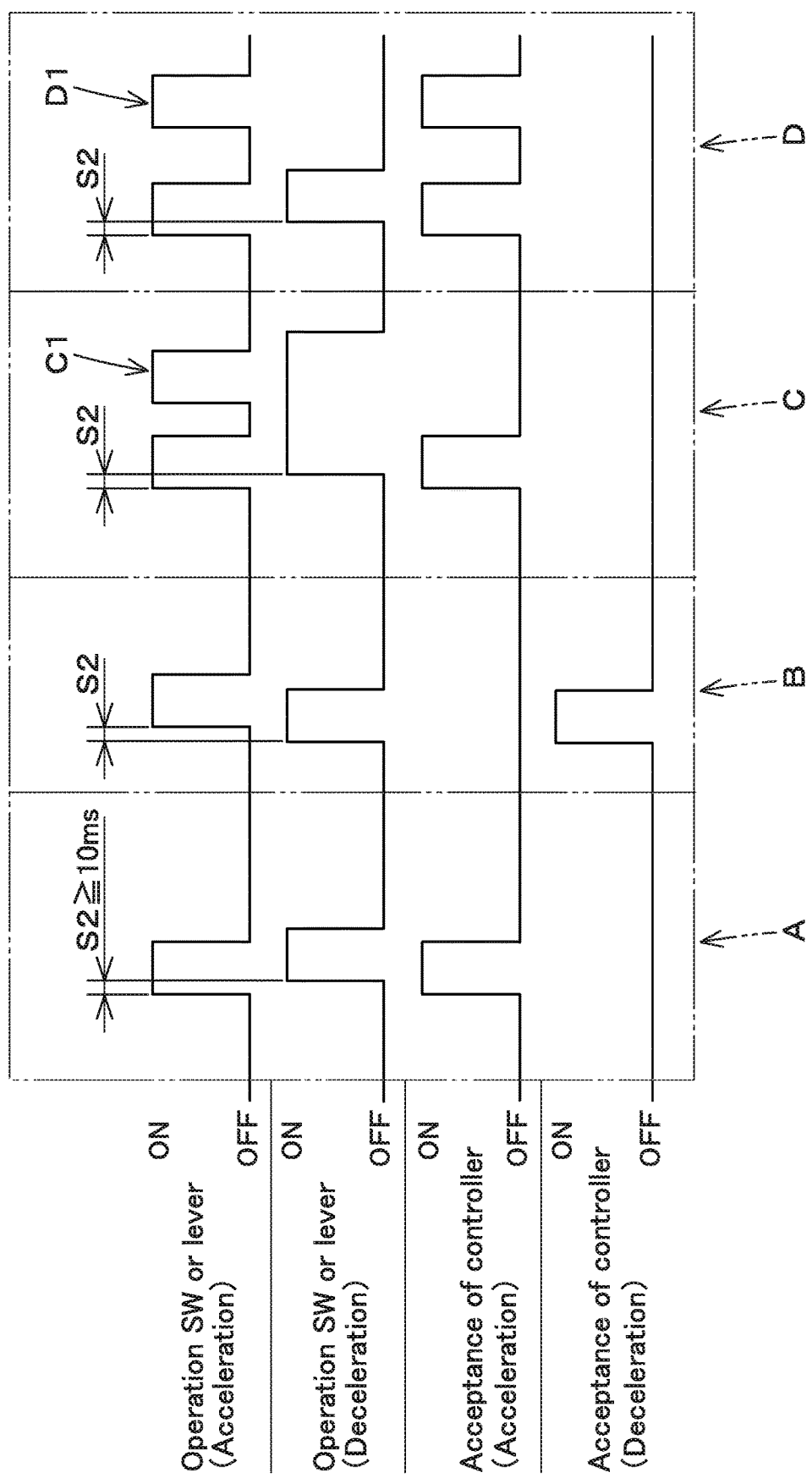
FIG. 20 is another view illustrating a relation between an operation of a speed shifting device and acceleration or deceleration operations of an operation lever and an operation switch according to the embodiment.

FIG. 19 and FIG. 20 illustrate the relation between the operation of the operation lever 21, the operation of the operation switches (fourteenth front operation tool 74, fifteenth front operation tool 75), and the operation of the speed shifter (main transmission) by the controller device.

As shown in part A of FIG. 19, the controller device is able to operate the operation lever 21 and the operation switches (fourteenth front operation tool 74 and fifteenth front operation tool 75) when one of them is in the operating position (ON) for the accelerating operation and the other is in the operating position (ON) for the deceleration operation, when one of them is in the operating position and the other is in the operating position. When the time difference S1 between the time (for example, less than 10 ms) and the time difference S1 is less than the predetermined time (for example, less than 10 ms), both the operation of the operation lever 21 and the operation switches (the fourteenth front operation tool 74 and the fifteenth front operation tool 75) are disabled (no operation is accepted) and the speed shifter is not allowed to execute the speed-shift (speed increase or decrease).

As shown in parts A and B of FIG. 20, when one of the operating levers 21 and the operation switches (fourteenth front operation tool 74, fifteenth front operation tool 75) is in the operating position (ON) for acceleration and the other is in the operating position (ON) for deceleration, the controller device validates an operation of one firstly positioned to an operating position (accepts the operation) and invalidates an operation of the other lately positioned to an operating position (rejects the operation) in a case where the time difference S2 between time when one is firstly positioned to the operating position and time when the other is lately positioned to the operating position is a predetermined time or more (for example, 10 ms or more).

In particular, in part A, the controller enables the accelerating operation, which is the operation of the first to enter the operating position, and disables the deceleration operation, which is the operation of the first to enter the operating position, to cause the speed shifter to perform the speed increase. The accelerating operation, which is the operation of the later operating position, is disabled and the speed shifter is forced to execute deceleration.

As shown in part B of FIG. 19, the controller enables the accelerating operation and causes the speed shifter to execute the speed increase even when the time difference S1 between the time when one of the operation levers 21 and the operation switches (the fourteenth front operation tool 74 and the fifteenth front operation tool 75) is in the operating position (ON) for the accelerating operation and the other is also in the operating position (ON) for the speed increasing device is less than a predetermined time (for example, less than 10 ms).

In other words, when one of the operation levers 21 and the operation switches (the fourteenth front operation tool 74 and the fifteenth front operation tool 75) is in the operating position for the accelerating operation and the other is also in the operating position for the speed increasing device, the controller causes the speed shifter to perform the acceleration regardless of the time difference between the time when one is in the operating position and the time when the other is in the operating position.

As shown in part C of FIG. 19, the controller device enables the deceleration operation and causes the speed shifter to perform the deceleration when one of the operation levers 21 and the operation switches (the fourteenth front operation tool 74 and the fifteenth front operation tool 75) is in the operating position (ON) for the deceleration operation and the other is also in the operating position (ON) for the deceleration operation, even when the time difference S1 between the time when one is in the operating position and the other is less than a predetermined time (for example, less than 10 ms).

In other words, when one of the operation levers 21 and the operation switches (the fourteenth front operation tool 74 and the fifteenth front operation tool 75) is in the operating position for the deceleration operation and the other is also in the operating position for the deceleration operation, the controller device causes the speed shifter to perform the deceleration regardless of the time difference between the time when one is in the operating position and the time when the other is in the operating position.

As shown in part C of FIG. 20, after the operation lever 21 and the operation switch (fourteenth front operation tool 74, fifteenth front operation tool 75) both are in the operating position (ON), the controller device rejects the next operation (see an arrowed line C1) of the operation lever 21 or the operation switch (fourteenth front operation tool 74, fifteenth front operation tool 75) (invalidates the operation) until the operation lever 21 and the operation switch (fourteenth front operation tool 74, fifteenth front operation tool 75) both are in the non-operating position (OFF).

As shown in part D of FIG. 20, after the operation lever 21 and the operation switch (fourteenth front operation tool 74, fifteenth front operation tool 75) both are in the operating position (ON), the controller device accepts the next operation (see an arrowed line D1) of the operation lever 21 or the operation switch (fourteenth front operation tool 74, fifteenth front operation tool 75) (validates the operation) when the operation lever 21 and the operation switch (fourteenth front operation tool 74, fifteenth front operation tool 75) both are in the non-operating position (OFF).

<The Relation Between the Operating Direction of the Operation Tools and the Operator Seat>

As shown in FIG. 1, in a plan view, the operator seat 10 is located on an extension line L1 in the swinging direction of the operation lever 21. In a plan view, the operator seat 10 is located on an extension line L2 in the direction of rotation of the eleventh front operation tool 71 (the accelerator dial), which is a driving system control tool, in a plan view. As can be understood from the directions of the extension lines L1 and L2, in a plan view, the direction of swinging of the operation lever 21 and the direction of rotation of the eleventh front operation tool 71 are slightly inclined (displaced) with respect to the front-to-back directions, and shift towards the operator seat 10 (left side) as it moves rearward.

The extension line L1 in the swinging direction of the operation lever 21 is a line that passes through the swing body 22 of the operation lever 21 in a plan view.

In a plan view, the operator seat 10 is located on an extension line L3 in the direction of the line of the plurality of pressing operation tools (the fourteenth front operation tool 74, the fifteenth front operation tool 75) provided on the side (partial side surface 16g) of the armrest 15. As can be understood from the direction of the extension line L3, in a plan view, the direction of the arrangement of the pressing operation tools (the fourteenth front operation tool 74, the fifteenth front operation tool 75) is inclined (displaced) with respect to the front-to-back directions and shifts toward the operator seat 10 (left side) as it moves toward the rear.

The operator seat 10 is located on a longitudinal extension line L4 of the surface (second surface) 25a of the operating section 25 of the operation lever 21. The surface (second surface) 25a is an attachment surface on which the pressing operation tools (operation switches 30 and 32) and the like are provided for performing operations related to driving in a pressing manner. The longitudinal direction of the surface (second surface) 25a of the operating portion 25 is parallel to the longitudinal direction of the operation switches 30 and 31. The longitudinal direction is also parallel to the longitudinal direction of the standing surface 24e.

As can be understood from the orientation of the extension line L4, the longitudinal direction of the surface (second surface) 25a of the operating portion 25 in plan view is slightly inclined (displaced) with respect to the front-to-back direction and shifts to the operator seat 10 side (left side) as it moves toward the rear.

The angle of tilt (deviation) of the extension lines L1, L2, L3, and L4 in the direction of the armrest 15 in relation to the longitudinal direction (front and rear) is an acute angle (for example, a range of about 10° to 30°).

As described above, the operator seat 10 is located on an extension line L1 in the swinging direction of the operation lever 21, on an extension line L2 in the rotational direction of the eleventh front operation tool 71, on an extension line L3 in the line direction of a plurality of pressing operation tools (fourteenth front operation tool 74, fifteenth front operation tool 75) on the side of the armrest 15, and on a longitudinal extension line L4 of the second surface 25a.

This makes the direction of the arm and the respective extension lines L1, L2, L3, and L4 approximately parallel to the direction of the arm when the hand is extended from the operator seat 10. This makes it easier for an operator who reaches out from the operator seat 10 to operate the controls.

In addition, in the operator seat 10, at least one of the backrest portions 10a and the seat portion 10b may be located on the extension lines L1, L2, L3, and L4. That is, both the backrest portion 10a and the seat portion 10b may be located on the extension lines L1, L2, L3, and L4, or only the backrest portion 10a may be located on the extension lines L1, L2, L3, and L4, or only the seat portion 10b may be located on the extension lines L1, L2, L3, and L4.

When the position of the armrest 15 with respect to the operator seat 10 is adjustable, the operator seat 10 should be located on the extension lines L1, L2, L3, and L4 at least at any of positions of the armrest 15.

The extension lines L1, L2, L3, and L4 extend in plane view in an approximate parallel to the inclining surface 16c1 of the armrest 15. Each extension lines L1 and L2 in the direction of the swinging direction of the operation lever 21 and the direction of rotation of the eleventh front operation tool 71 (accelerator dial) 11, which is a traveling system control tool, is inclined with respect to the longitudinal direction of the armrest 15 in a plan view.

The arrangement of the push-down operation tools (the fourteenth front operation tools 74 and the fifteenth front operation tools 75) is tilted in a plane view with respect to the longitudinal direction of the armrest 15. The longitudinal direction of the armrest 15 is front and rear, and the operator seat 10 is not located on an extension of the longitudinal direction of the armrest 15.

In plan view, the swinging direction of the twelfth front operation tool 72 and thirteenth front operation tool 73, which are working operation tools, is parallel to the rotational direction of the eleventh front operation tool 71, which is a traveling system operation tool.

This makes the direction of reaching out from the operator seat 10 and the swinging direction of the twelfth and thirteenth front operation tools 72 and the thirteenth front operation tools 73 roughly parallel, thereby making it easier to operate the twelfth and thirteenth front operation tools 72 and 73 from the operator seat 10.

In a plan view, the longitudinal direction of the operation switches 30 and 31 is slightly displaced with respect to the front-to-back direction and shifts to the operator seat 10 side (left side) as it moves rearward.

This makes the direction of the arm when reaching from the operator seat 10 and the longitudinal direction of the operation switches 30 and 31 to be roughly parallel with the direction of the arm when reaching from the operator seat 10. This makes it easier for an operator who reaches out from the operator seat 10 to operate the operation switches 30 and 31, which are seesaw switches, to operate the operation switches 30 and 31.

<Effects>

According to the above working vehicle, the following effects are achieved.

The working vehicle 1 has the operator seat 10, the armrest 15 provided on the side of the operator seat 10, and the speed shifter for changing the traveling speed, the armrest 15 having the operation lever 21 which causes the speed shifter to increase or decrease the speed by swinging forward or backwardly, and the operation switches 74 and 75 which causes the speed shifter to increase or decrease the speed in a pressing manner.

According to this configuration, even when the operation lever 21 is difficult to operate due to the posture of the operator, and the like, the speed shifter can be smoothly shifted by operating the operation switches 74 and 75, which allow the speed shifter to execute the acceleration or deceleration by pressing the operation switches 74 and 75.

For example, when an operator seated on the operator seat 10 turns around to operate the speed-shift while looking backwards, the speed-shift can be operated by pressing the operation switches 74 and 75 instead of the operation lever 21.

The operation lever 21 protrudes upwardly from the upper surface of the armrest 15, and the operation switches 74 and 75 are located on the sides of the armrest 15.

According to this configuration, even when the operator is in a position where it is difficult to reach above the armrest 15, the operator can press the operation switches 74 and 75 located on the sides of the armrest 15 to operate the speed-shift.

The operation switches 74 and 75 are located on the side surface 16c of the operator seat 10 side of the armrest 15.

According to this configuration, when an operator seated on the operator seat 10 turns around to operate the speed-shift while looking backwards, the operation switches 74 and 75 arranged on the side surface 16c of the armrest 15 can be easily pressed to operate the speed-shift.

The armrest 15 has the elbow rest 18 on which an operator seated on the operator seat 10 places his or her elbows, the operation lever 21 is arranged in front of the elbow rest 18, and the operation switches 74 and 75 are arranged behind the operation lever 21 and in front of the elbow rest 18.

According to this configuration, when an operator seated on the operator seat 10 turns around to operate the speed-shift while looking backwards, the operation switches 74 and 75 in front of the armrest 18 of the armrest 15 can be easily pressed to operate the speed-shift by placing the arm on the armrest 18.

The operation switches 74 and 75 include a speed increase switch 74 for increasing the speed and a deceleration switch 75 for decreasing the speed, and the speed increase switch 74 and the deceleration switch 75 are arranged side by side (partial side) 16g in the front-to-back direction.

According to this configuration, the increasing speed switch 74 and the decreasing speed switch 75 are arranged at different distances from the elbow rest 18, thereby preventing the two switches from being confused for operation.

The acceleration switch 74 and the decreasing speed switch 75 are arranged with the switch located forward above the switch located rearward.

According to this configuration, the operation switch 74 arranged on the side (front) far from the elbow rest 18 will be located upward, making it easier for the thumb to reach the operation switch 74 and improving operability.

The operation switches 74 and 75 are push-button switches.

According to this configuration, since the operation of the operation switches 74 and 75 is simple, the operation switches 74 and 75 can be operated reliably even when the operator seated on the operator seat 10 is shifting gears while looking backwards.

The pivot axis (swing body 22) of the operation lever 21 is located closer to the side surface 16d opposite the operator seat 10 than to the side surface 16c of the operator seat 10 side of the armrest 15.

According to this configuration, the pivot axis 22 of the operation lever 21 is displaced on the opposite side of the operation switches 74 and 75, thus facilitating selective use of the operating levers 21 and the operation switches 74 and 75, which have the same function, to be displaced apart from each other.

The working vehicle 1 has the operator seat 10 and the armrest 15 provided on the side of the operator seat 10, and the armrest 15 has the operation lever 21 for operating the vehicle for driving by swinging forward or backward, and the traveling operation tool 71 for operating the vehicle for traveling by rotating around a horizontal axis, with the operator seat 10 located on each extension lines L1 and L2 of the swinging direction of the operation lever 21 and the rotating direction of the traveling system operation tool 71 in a plan view.

According to this configuration, the operation lever 21, which operates the operation relating to driving by swinging forward or backward, and the traveling system operation tool 71, which operates the operation relating to driving by rotating around a lateral axis, are both provided in the armrest 15, and the operator seat 10 is located each extensions L1 and L2 of the swinging direction of the operation lever 21 and the rotating direction of the traveling system operation tool 71.

As a result, the direction of the arm extended by the operator seated on the operator seat 10 is close to the direction of the swinging direction of the operation lever 21 and the direction of rotation of the traveling system operation tool 71 in parallel with the direction of the swinging direction of the operation lever 21 and the direction of rotation of the traveling system operation tool 71, thereby providing excellent operability of the operation tools (the operation lever 21 and the traveling system operation tool 71) that perform operations related to traveling.

Each of extension lines L1 and L2 in the direction of swinging of the operation lever 21 and the direction of rotation of the traveling system operation tool 71 is tilted in plan view with respect to the longitudinal direction of the armrest 15.

According to this configuration, by arranging the longitudinal direction of the armrest 15 along the operator seat 10, the ease of placing the operator's arms on the armrest 15 makes it easier for the operator to place his or her arms on the armrest 15, while improving the operability of the operation tools (the operation lever 21 and the traveling system controls 71) for the operator seated on the operator seat 10 to operate the traveling-related controls.

On the side surface 16c of the armrest 15, a plurality of pressing operation tools 74 and 75 are provided on the side surface 16c of the armrest 15 to perform operations related to traveling in pressing manner, and the operator seat 10 is located on the extension line L3 in the direction of the plurality of pressing operation tools 74 and 75 in a plan view.

According to this configuration, the direction of the arm extended by the operator seated on the operator seat 10 and the direction of the plurality of pressing operation tools 74 and 75 are close to parallel with the direction of the line of the plurality of pressing operation tools 74 and 75, thereby making it easier for the operator seated on the operator seat 10 to operate the pressing operation tools 74 and 75.

The operation lever 21 has an attachment surface (second surface) 25a on which a pressure operative 30, which is different from the pressure operative 30, is provided, and the operator seat 10 is located on a longitudinal extension line L4 of the attachment surface 25a.

According to this configuration, the direction of the arm extended by the operator seated on the operator seat 10 and the longitudinal direction of the attachment surface 25a are close to parallel with the longitudinal direction of the attachment surface 25a, which makes it easier for the operator seated on the operator seat 10 to operate the pressure control tool 30 provided on the attachment surface 25a.

The armrest 15 has working operation tools 72 and 73 that perform operations related to work by swinging around a horizontal axis, and the traveling system operation tools 71 and the working system operation tools 72 and 73 are arranged side by side in the width direction of the armrest 15, and a protrusion 84 is provided between the traveling system operation tools 71 and the working system operation tools 72 and 73.

According to this configuration, it is possible to prevent the operation of either the travel system operation tool 71 or the working system operation tool 72 and 73 from accidentally coming into contact with either of the other operation tools, resulting in a mis-operation.

The swinging direction of the working system operation tool 72 and 73 and the rotational direction of the traveling system operation tool 71 are parallel in plan view, and the projections 84 extend parallel to the swinging direction of the working system operation tool 72 and 73 and the rotational direction of the traveling system operation tool 71.

According to this configuration, the operability of the working system controls 72 and 73 and the travel system controls 71 can be operated from the same direction, and the protrusions 84 allow the working system controls 72 and 73 and the travel system controls 71 to be clearly distinguished from each other.

The traveling system operator 71 is located on the operator seat 10 side, and the working system operators 72 and 73 are located on the opposite side of the operator seat 10.

According to this configuration, for example, the traveling system operation tool 71, which performs operations related to traveling by rotation around a horizontal axis, can be operated with a thumb or index finger, and the working system operation tool 72 and 73, which performs operations related to work by swinging around a horizontal axis, can be operated with a finger other than a thumb, and so on.

The armrest 15 has the pedestal 20 which supports the base portion of the operation lever 21, the pedestal 20 is raised on the front portion of the armrest 15, and the front portion 84a of the protrusion 84 is connected to the side of the pedestal 20 (left side 20d).

According to this configuration, the strengths of the protrusion 84 and the pedestal 20 can be improved by connecting the protrusion 84 to the pedestal 20.

The working vehicle 1 has the operator seat 10 and the armrest 15 provided on the side of the operator seat 10, and the armrest 15 has the operation tool arrangement portion 19 on the upper surface 16a and the concave portion 15a on the side surface 16d, wherein the concave portion 15a is provided in an area overlapping the area where the operation tool arrangement portion 19 is provided in the front-to-back direction.

According to this configuration, while the position of the hand is fixed by placing the fingers against the concave portion 15a, the remaining fingers can be extended to operate the operation tool arranged in the operation tool arrangement portion 19 on the upper surface 16a of the armrest 15. Thus, the operability of the operation tool arranged on the upper surface 16a of the armrest 15 is excellent in operating the operation tool arranged on the upper surface 16a of the armrest 15.

A plurality of operation tools are arranged in the operation tool arrangement portion 19 in the front-to-back direction, and the concave portion 15a is provided in the front-to-back direction over the entire length of the region where the plurality of operation tools are provided.

According to this configuration, while the position of the hand is fixed by placing the fingers on the concave portion 15a, the remaining fingers can be extended to operate a plurality of the operation tools aligned in the front-to-back direction. As a result, it is superior in operability when operating the plurality of controls aligned in the front-to-back directions.

A plurality of operation tools are arranged in line in the operation tool arrangement portion 19 from the side of the side surface 16d on which the concave portion 15a is provided to the side surface 16c on the opposite side of the side surface 16d.

According to this configuration, with the position of the hand fixed by placing the fingers against the concave portion 15a, the remaining fingers can be extended to operate the plurality of operation tools aligned from the side of the side surface 16d to the side surface 16c opposite the side surface 16d. As a result, the plurality of controls aligned in the width direction of the armrest 15 are easy to operate.

The concave portion 15a is provided on the side surface 16d opposite the operator seat 10.

According to this configuration, with the fingers except the thumb, placed against the concave portion 15a to fix the position of the hand, the thumb can be extended to operate the operation tools arranged in the operation tool arrangement portion 19 on the upper surface 16a of the armrest 15. Thus, the operability of the operation tool arranged on the upper surface 16a of the armrest 15 is excellent for operating the operation tool arranged on the upper surface 16a of the armrest 15.

The concave portion 15a is large enough to allow an operator seated on the operator seat 10 to hook four fingers excluding the thumb, when operating the operation tool arranged in the operation tool arrangement portion 19.

According to this configuration, with the four fingers except the thumb, hooked into the concave portion 15a to keep the position of the hand firmly in place, the thumb can be extended to operate the operation tool arranged in the operation tool arrangement portion 19 on the upper surface 16a of the armrest 15.

The armrest 15 has an elbow rest 18 for an operator seated on the operator seat 10 to place his or her elbows on, the operation tool arrangement portion 19 is arranged in front of the elbow rest 18, and the concave portion 15a is provided in the front-to-back direction in an area straddling between the elbow rest 18 and the operation tool arrangement portion 19.

According to this configuration, the operator can secure the position of the hand in a stable position by placing his fingers on the concave portion 15a with his elbow on the elbow rest 18.

The front portion of the elbow rest 18 is provided with an inclining surface 18f that slopes downwardly toward the operation tool arrangement portion 19.

According to this configuration, the operability of the operation tools arranged in the operation tool arrangement portion 19, which are located near the front portion of the elbow rest 18, can be operated unobstructed by the elbow rest 18, and the operability of the operation tools can be improved.

The inclining surface 18f is provided on the side where the concave portion 15a of the armrest 18 is provided in the width direction of the armrest 15.

According to this configuration, the operation tool provided on the side where the concave portion 15a is provided can be operated unobstructed by the elbow rest 18 with a finger placed on the concave portion 15a, thereby improving the operability of the operation tool.

The upper surface on which the operation tool arrangement portion 19 is provided is lower in the width direction of the armrest 15 than the height of the area on the side where the concave portion 15a is provided, compared to the height of the area on the opposite side where the concave portion 15a is provided.

According to this configuration, when a finger (for example, four fingers other than a thumb) is placed on the concave portion 15a and another finger (for example, the thumb) is extended toward the opposite side where the concave portion 15a is provided, the height of the upper surface on the root side of the other finger is lower than the height of the upper surface on the tip side. This makes it easier to operate the finger when the other finger is extended.

The upper surface on which the operation tool arrangement portion 19 is provided has the upper surface 15A on one side, which is an area on the side where the concave portion 15A is provided, the upper surface 15C on the other side, which is an area opposite to the side where the concave portion 15A is provided, and the middle upper surface 15B, which is the area between the upper surface 15A on one side and the upper surface 15C on the other side, the middle upper surface 15B being higher than the upper surface 15A on one side and lower than the upper surface 15C on the other side.

According to this configuration, since the upper surface on which the operation tool arrangement portion 19 is provided is in the form of a staircase that becomes higher and higher as it separating away from the concave portion 15a, the operability is better when a finger (for example, four fingers other than a thumb) is placed on the concave portion 15a and another finger (for example, the thumb) is extended toward the side opposite the side on which the concave portion 15a is provided.

On one upper surface 15A, operation tools 61 to 65 of the traveling system for operations related to traveling are arranged, and on the other upper surface 15C, operation tools 69 and 70 of the working system for operations related to working are arranged.

According to this configuration, the travel system operation tools 61 to 65 are arranged on the high side of the operation tool arrangement portion 19, and the working system operation tools 69 and 70 are arranged on the low side of the 19, thus making it possible to clearly distinguish between the traveling operation tools and the working operation tools.

The controller device is provided with the controller device that controls the action of the speed shifter based on the operation of the operation lever 21 or the operation switch (fourteenth front operation tool 74 or fifteenth front operation tool 75), and when one of the operating levers 21 and the operation switches (fourteenth front operation tool 74, fifteenth front operation tool 75) is in the operating position for acceleration and the other is in the operating position for deceleration, the controller device invalidates both of the operations of the operating levers 21 and the operation switches (fourteenth front operation tool 74, fifteenth front operation tool 75) in a case where the time difference between time when one is firstly positioned to the operating position and time when the other is lately positioned to the operating position is less than a predetermined time, and validates the operation of one firstly positioned to the operating position and invalidates the operation of the other lately positioned to the operating position in a case where the time difference is the predetermined time or more.

According to this configuration, an appropriate response can be made by the controller when conflicting operations (accelerating operation and decelerating operation) are performed with the operation lever 21 and the operation switch (fourteenth front operation tool 74 or fifteenth front operation tool 75). In particular, when the conflicting operations are performed with a time difference of less than a predetermined time length, there is a high possibility of a wrong operation, and by disabling both operations, the operator can avoid unintended speed-shifting caused by the wrong operation.

When the conflicting operations are performed in turn at a predetermined time or more, the possibility of erroneous operations is low, and thus, a speed-shift reflecting the operator's intentions can be performed with the earlier operation under the condition that the previously performed operation is validated.

The controller device causes the speed shifter to execute an accelerating operation regardless of the time difference between time when one of the operating levers 21 and the operation switches (fourteenth front operation tool 74 or fifteenth front operation tool 75) is positioned to the operating position and time when the other is positioned to the operating position in a case where the one is firstly positioned to the operating position for acceleration and the other also is lately positioned to the operating position for acceleration.

According to this configuration, when both the operation lever 21 and the operation switch (the fourteenth front operation tool 74 or the fifteenth front operation tool 75) are in the operating position for the accelerating operation, the intention of the operator to perform the deceleration operation is clear, and thus, regardless of the time difference between the time when one is in the operating position and the other is in the operating position, the speed shifter can be made to perform the accelerating operation to reflect the intention of the operator.

The controller device causes the speed shifter to perform deceleration when one of the operation levers 21 and the operation switches (fourteenth front operation tool 74 or fifteenth front operation tool 75) is in the operation position for deceleration and the other is also in the operation position for deceleration, regardless of the time difference between when one is in the operation position and when the other is in the operation position.

According to this configuration, when both the operation lever 21 and the operation switch (the fourteenth front operation tool 74 or the fifteenth front operation tool 75) are in the operating position for deceleration, the intention of the operator to perform the decelerating operation is clear, and thus, regardless of the time difference between the time when one is in the operating position and the other is in the operating position, the speed shifter can be made to reflect the intention of the operator to perform the deceleration.

After the operation lever 21 and the operation switch (fourteenth front operation tool 74 or fifteenth front operation tool 75) are both in the operating position, the controller device does not accept the next operation of the operation lever 21 or the operation switch (fourteenth front operation tool 74 or fifteenth front operation tool 75) until both the operation lever 21 and the operation switch (fourteenth front operation tool 74 or fifteenth front operation tool 75) are in the non-operating position.

According to this configuration, when the operator mistakenly places both the operation lever 21 and the operation switch (the fourteenth front operation tool 74 or the fifteenth front operation tool 75) in the operating position, the operation lever 21 and the operation switch (the fourteenth front operation tool 74 or the fifteenth front operation tool 75) must be returned to the non-operating position and then operated again before the speed-shift can be performed, thus preventing the speed-shifting from being performed based on the operator's error.

According to the embodiment described above, a working vehicle comprising: an operator seat; and an armrest arranged on a side of the operator seat, wherein the armrest includes: an upper surface on which an operation tool arrangement portion is arranged, the operation tool arrangement portion arranging an operation tool; and a side surface having a concave portion, and the concave portion is located on an area overlapping, in a front-to-back direction, with another area including the operation tool arrangement portion.

The working vehicle mentioned above, wherein the operation tool includes a plurality of operation tools, the operation tool arrangement portion arranges the plurality of operation tools, and the concave portion is provided in the front-to-back direction over an entire length of the other area including the plurality of operation tools are provided.

The working vehicle mentioned above, wherein the operation tool arrangement portion arranges the plurality of operation tools in a direction from the side surface having the concave portion to another side surface of the armrest opposed to the side surface.

The working vehicle mentioned above, wherein the concave portion is provided on the side surface opposed to the operator seat.

The working vehicle mentioned above, wherein the concave portion has a size allowing four fingers other than a thumb of an operator seating on the operator seat to be placed on the concave portion when the operator operates the operation tools arranged on the operation tool arrangement portion.

The working vehicle mentioned above, wherein the armrest includes an elbow rest on which the operator seating on the operator seat places an elbow of the operator, the operation tool arrangement portion is arranged in front of the elbow rest, and the concave portion is provided in a region extending in the front-to-back direction over the elbow rest and the operation tool arrangement portion.

The working vehicle mentioned above, wherein the elbow rest includes a front portion having an inclining surface that downwardly inclines toward the operation tool arrangement portion.

The working vehicle mentioned above, wherein the inclining surface is provided on a side of the elbow rest next to the concave portion in a width direction of the armrest.

The working vehicle mentioned above, wherein the upper surface having the operation tool arrangement portion includes a region including the concave portion is lower in height than another region opposed to the region including the concave portion.

The working vehicle mentioned above, wherein the upper surface having the operation tool arrangement portion includes: one upper surface that is the region including the concave portion; another upper surface that is the other region opposed to the region including the concave portion; and a middle upper surface that is a region provided between the one upper surface and the other upper surface, and the middle upper surface is higher than the one upper surface and lower than the other upper surface in height.

The working vehicle mentioned above, wherein the plurality of operation tools includes: a traveling operation tool to be operated to perform a traveling operation; and a working operation tool to be operated to perform a working operation, the traveling operation tool is arranged on the one upper surface, and the working operation tool is arranged on the other upper surface.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working vehicle comprising:
   an operator seat;
   an armrest arranged on a side of the operator seat; and
   a speed shifter to change a traveling speed, wherein
   the armrest includes:
      an operation lever to be swung back and forth to cause the speed shifter to perform acceleration and deceleration; and
      an operation switch to be pressed to cause the speed shifter to perform acceleration and deceleration, wherein
   the operation lever projects upward from an upper surface of the armrest, and
   the operation switch is arranged on a side surface of the armrest.

2. The working vehicle according to claim 1, wherein the operation switch is arranged on a side of the armrest on the operator seat side.

3. The working vehicle according to claim 1, wherein the operation switch includes:
   an acceleration switch to perform an acceleration operation; and
   a deceleration switch to perform a deceleration operation, and
   the acceleration switch and the deceleration switch are arranged front and rear on the side of the armrest.

4. The working vehicle according to claim 3, wherein one arranged front of the acceleration switch and the deceleration switch is arranged higher than the other arranged rear.

5. The working vehicle according to claim 1, wherein the operation switch is a push button switch.

6. The working vehicle according to claim 2, wherein the operation lever has a pivot shaft arranged closer to a side of the armrest, the side being opposed to the operator seat.

7. The working vehicle according to claim 1, comprising a controller device to control the shifter device based on operations of the operation lever and the operation switch, wherein
when one of the operation lever and the operation switch is at a position for acceleration and the other is at another position for deceleration, the controller device invalidates both operations of the operation lever and the operation switch in a case where a time gap between when the one of the operation lever and the operation switch is switched to the position and when the other is switched to the other position is less than a predetermined length, and validates early one of the operations of the operation lever and the operation switch and invalidates late one of the operations in a case where the time gap is the predetermined length or more.

8. The working vehicle according to claim 7, wherein
when one of the operation lever and the operation switch is at the position for acceleration and the other is at the position for acceleration, the controller device instructs the shifter device to perform acceleration regardless of the time gap between when the one of the operation lever and the operation switch is switched to the position and when the other is switched to the position.

9. The working vehicle according to claim 7, wherein
when one of the operation lever and the operation switch is at the other position for deceleration and the other is at the other position for deceleration, the controller device instructs the shifter device to perform deceleration regardless of the time gap between when the one of the operation lever and the operation switch is switched to the other position and when the other is switched to the other position.

10. The working vehicle according to claim 7, wherein
after both of the operation lever and the operation switch are switched to either the position or the other position, the controller device rejects an operation of the operation lever or an operation of the operation switch until both of the operation lever and the operation switch are released from either the position or the other position.

11. A working vehicle comprising:
an operator seat; and
an armrest arranged on a side of the operator seat, wherein the armrest includes:
an operation lever to be operated back or forth to perform a traveling operation; and
a traveling operation tool to be operated rotatably about a lateral axis to perform the traveling operation,
the operator seat is located on extensions of operational directions of the operation lever and the traveling operation tool,
the armrest has
a working operation tool to be operated swingably about a lateral axis to perform a working operation, and
a pedestal supporting a base portion of the operation lever, and
the traveling operation tool and the working operation tool are arranged side by side in a width direction of the armrest,
the working vehicle includes a protrusion located between the traveling operation tool and the working operation tool,
the pedestal is provided bulging on a front portion of the armrest, and
a front portion of the protrusion is connected to a side surface of the pedestal.

12. The working vehicle according to claim 11, wherein
the extensions of operational directions of the operation lever and the traveling operation tool incline with respect to a longitudinal direction of the armrest in plan view.

13. The working vehicle according to claim 11, comprising
a plurality of pressing operation tools to be operated in a pressing manner to perform the traveling operation, the plurality of pressing operation tools being arranged on a side of the armrest, wherein
the operator seat is located on an extension of an arrangement direction of the plurality of pressing operation tools.

14. The working vehicle according to claim 11, wherein
the operation lever includes
an attachment surface on which another pressing operation tool different from the pressing operation tool is provided, the other pressing operation tool being configured to be operated in a pressing manner to perform the traveling operation, and
the operator seat is located on an extension of the attachment surface in a longitudinal direction of the attachment surface.

15. The working vehicle according to claim 11, wherein
an operational direction of the working operation tool is substantially parallel to an operational direction of the traveling operation tool in plan view, and
the protrusion extends in parallel to the operational directions of the working operation tool and the traveling operation tool.

16. The working vehicle according to claim 11, wherein
the traveling operation tool is arranged on the operator seat side, and
the working operation tool is arranged opposite to the operator seat side.

\* \* \* \* \*